(12) United States Patent
Ishii

(10) Patent No.: US 11,545,102 B2
(45) Date of Patent: Jan. 3, 2023

(54) DISPLAY DEVICE AND ELECTRONIC SIGNBOARD

(71) Applicant: Japan Display Inc., Tokyo (JP)

(72) Inventor: Tatsuya Ishii, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/212,576

(22) Filed: Mar. 25, 2021

(65) Prior Publication Data

US 2021/0210036 A1 Jul. 8, 2021

Related U.S. Application Data

(63) Continuation of application No. PCT/JP2019/025247, filed on Jun. 25, 2019.

(30) Foreign Application Priority Data

Sep. 26, 2018 (JP) .............................. JP2018-180951

(51) Int. Cl.
  *G09G 5/00* (2006.01)
  *G09G 3/36* (2006.01)

(52) U.S. Cl.
  CPC ... *G09G 3/3614* (2013.01); *G09G 2300/0842* (2013.01); *G09G 2320/046* (2013.01)

(58) Field of Classification Search
  CPC .................. G09G 2300/0842; G09G 2320/043
  See application file for complete search history.

(56) References Cited

U.S. PATENT DOCUMENTS

| | | | |
|---|---|---|---|
| 4,959,812 A | 9/1990 | Momodomi et al. | |
| 5,587,668 A * | 12/1996 | Shibata ............... | G11C 16/0408 326/119 |
| 2002/0044333 A1* | 4/2002 | Shigehiro ............... | G02F 1/167 359/296 |
| 2003/0142054 A1* | 7/2003 | Tada ..................... | G09G 3/3648 345/87 |
| 2011/0057918 A1* | 3/2011 | Kimura ............. | H01L 29/78693 345/211 |
| 2013/0307421 A1* | 11/2013 | Tanada .................. | G09G 3/3659 315/172 |
| 2014/0232706 A1* | 8/2014 | Iwasa .................... | G09G 3/3648 345/206 |
| 2016/0282686 A1* | 9/2016 | Kubota ............. | G02F 1/134363 |

FOREIGN PATENT DOCUMENTS

| | | |
|---|---|---|
| JP | S58-196582 A | 11/1983 |
| JP | 2685770 B2 | 8/1997 |
| JP | H09-212140 A | 8/1997 |

* cited by examiner

*Primary Examiner* — Nan-Ying Yang
(74) *Attorney, Agent, or Firm* — K&L Gates LLP

(57) ABSTRACT

According to an aspect, a display device includes a plurality of sub-pixels. Each of the sub-pixels includes a memory block including a memory configured to store therein sub-pixel data and a sub-pixel electrode coupled to the memory block. The memory includes first and second transistors configured to store therein the sub-pixel data in accordance with an electrical charge of a floating gate, the first and second transistors include respective drains that are coupled to each other, and a coupling point of the drains is coupled to a node. The sub-pixel electrode is coupled to the node, and each of the sub-pixels is configured to display an image based on a potential of the node.

1 Claim, 24 Drawing Sheets

FIG.7

| xGate | Gate | STATE OF FLOATING GATE | Vout |
|---|---|---|---|
| 3V | 0V | ELECTRONS ARE INJECTED | HIGH LEVEL (3V) |
| 3V | 0V | ELECTRONS ARE EXTRACTED | LOW LEVEL (0V) |
| 6V | -3V | ELECTRONS ARE INJECTED | UNSTABLE |
| 6V | -3V | ELECTRONS ARE EXTRACTED | UNSTABLE |

FIG.8

| TRANSISTOR CONDITIONS | RWTn | | RWTp | |
|---|---|---|---|---|
| STATE OF FLOATING GATE | ELECTRONS ARE INJECTED | ELECTRONS ARE EXTRACTED | ELECTRONS ARE INJECTED | ELECTRONS ARE EXTRACTED |
| Vth | 2V | -1V | 1V | -2V |
| SELECTED (xGate=3V, Gate=0V) | OFF | ON | ON | OFF |
| NOT SELECTED (xGate=6V, Gate=-3V) | OFF | OFF | OFF | OFF |
| Vbody | 0V (VML) | | 3V (VMH) | |
| VMH | 3V | | | |
| VML | 0V | | | |

| OPERATION<br>PORTION | OPERATION OF<br>INJECTING<br>ELECTRONS | OPERATION OF<br>EXTRACTING<br>ELECTRONS |
|---|---|---|
| Gate, xGate | 20V | 0V |
| Vbody(p), Vbody(n) | 0V | 20V |
| VMH | 0V | 20V |
| VML | 10V | 20V |

FIG.12

| PORTION / PERIOD | | PLUS FIELD PERIOD | MINUS FIELD PERIOD |
|---|---|---|---|
| COMMON ELECTRODE | | 0V | 3V |
| PIXEL ELECTRODE | SUB-PIXEL DATA "1" | HIGH LEVEL (3V) | LOW LEVEL (0V) |
| | SUB-PIXEL DATA "0" (BLACK: NORMALLY BLACK) | LOW LEVEL (0V) | HIGH LEVEL (3V) |
| xGate1(+), xGate2(+) | | 3V (SELECTED) | 6V (NOT SELECTED) |
| Gate1(+), Gate2(+) | | 0V (SELECTED) | -3V (NOT SELECTED) |
| xGate1(-), xGate2(-) | | 6V (NOT SELECTED) | 3V (SELECTED) |
| Gate1(-), Gate2(-) | | -3V (NOT SELECTED) | 0V (SELECTED) |
| VMH(+) | | 3V | |
| VML(+) | | 0V | |
| VMH(-) | | 3V | |
| VML(-) | | 0V | |

FIG.13

| ROW / COLUMN | | FIRST COLUMN | SECOND COLUMN | THIRD COLUMN |
|---|---|---|---|---|
| FIRST ROW | FIRST MEMORY | 1 (WHITE) | 0 (BLACK) | 0 (BLACK) |
| | SECOND MEMORY | 0 (WHITE (INVERTED)) | 1 (BLACK (INVERTED)) | 1 (BLACK (INVERTED)) |
| SECOND ROW | FIRST MEMORY | 0 (BLACK) | 1 (WHITE) | 0 (BLACK) |
| | SECOND MEMORY | 1 (BLACK (INVERTED)) | 0 (WHITE (INVERTED)) | 1 (BLACK (INVERTED)) |

FIG.15

| PORTION | ERASING PERIOD | WRITING PERIOD | | | |
|---|---|---|---|---|---|
| | | STEP 1 | STEP 2 | STEP 3 | STEP 4 |
| VMH | 20V | 0V | | | |
| VML | 20V | 10V | | | |
| Data1, xData1 | 20V | 0V | 10V | 10V | 0V |
| Data2, xData2 | 20V | 10V | 0V | 0V | 10V |
| Data3, xData3 | 20V | 10V | 0V | 10V | 0V |
| Gate1(+), xGate1(+) | 0V | 20V | 10V | 10V | 10V |
| Gate1(-), xGate1(-) | 0V | 10V | 20V | 10V | 10V |
| Gate2(+), xGate2(+) | 0V | 10V | 10V | 20V | 10V |
| Gate2(-), xGate2(-) | 0V | 10V | 10V | 10V | 20V |

$t_{10}$  $t_{11}$  $t_{12}$  $t_{13}$  $t_{14}$  $t_{15}$

Vth=-2V(p-ch)
Vth=-1V(n-ch)

Vth=1V(p-ch)
Vth=2V(n-ch)

FIG.20A

| DURING PLUS FIELD PERIOD | THRESHOLD | ELECTRIC FIELD TO LIQUID CRYSTAL LAYER (LIQUID CRYSTAL MOLECULES) |
|---|---|---|
| DATA "1" (WRITE) | 1V (p-ch)<br>2V (n-ch) | GENERATE |
| DATA "0" (ERASE) | -2V (p-ch)<br>-1V (n-ch) | DOES NOT GENERATE |

FIG.20B

| DURING MINUS FIELD PERIOD | THRESHOLD | ELECTRIC FIELD TO LIQUID CRYSTAL LAYER (LIQUID CRYSTAL MOLECULES) |
|---|---|---|
| DATA "1" (WRITE) | 1V (p-ch)<br>2V (n-ch) | DOES NOT GENERATE |
| DATA "0" (ERASE) | -2V (p-ch)<br>-1V (n-ch) | GENERATE |

FIG.21

| PORTION | READING PERIOD | |
|---|---|---|
| VMH | 3V | |
| VML | 0V | |
| Vcom | 0V | 3V |
| Gate1(+), Gate2(+) | 0V | -3V |
| xGate1(+), xGate2(+) | 3V | 6V |
| Gate1(-), Gate2(-) | -3V | 0V |
| xGate1(-), xGate2(-) | 6V | 3V |
| Vpix11 | 3V (WHITE) | 0V (WHITE (INVERTED)) |
| Vpix21 | 0V (BLACK) | 3V (BLACK (INVERTED)) |
| Vpix12 | 0V (BLACK) | 3V (BLACK (INVERTED)) |
| Vpix22 | 3V (WHITE) | 0V (WHITE (INVERTED)) |
| Vpix13 | 0V (BLACK) | 3V (BLACK (INVERTED)) |
| Vpix23 | 0V (BLACK) | 3V (BLACK (INVERTED)) |
| | PLUS FIELD PERIOD | MINUS FIELD PERIOD |
| | $t_{16}$    $t_{17}$ | $t_{18}$ |

FIG.22

| | | FIRST EMBODIMENT OF PRESENT APPLICATION | JP-A-S58-196582 |
|---|---|---|---|
| NUMBER OF TRANSISTORS | INVERTING SWITCH | 0 | 4 |
| | MEMORY | 4 | 6 |
| TOTAL NUMBER | | 4 | 10 |

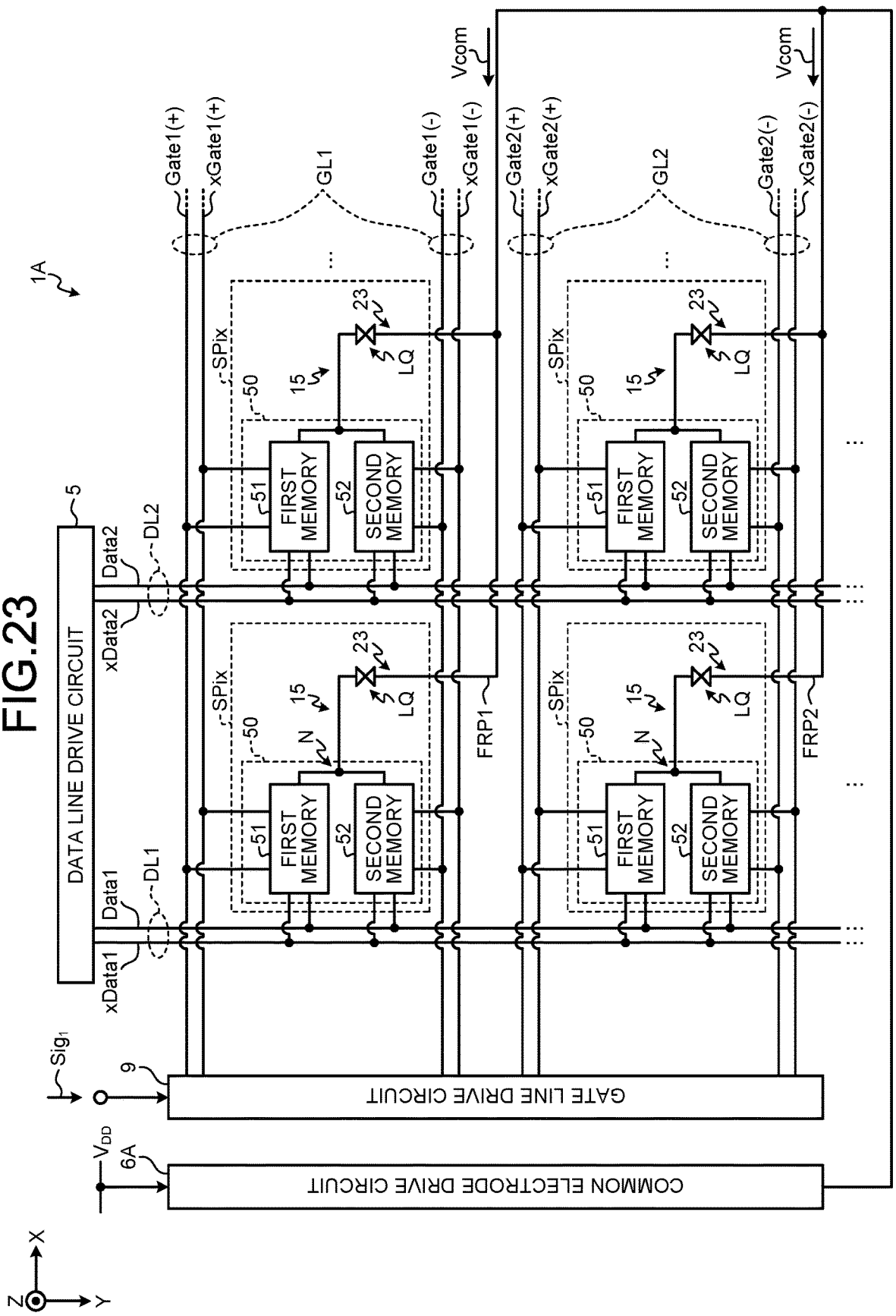

FIG.24

| PORTION | PERIOD | PLUS FIELD PERIOD | MINUS FIELD PERIOD |
|---|---|---|---|
| COMMON ELECTRODE | | 3V | 3V |
| PIXEL ELECTRODE | SUB-PIXEL DATA "1" | HIGH LEVEL (6V) | LOW LEVEL (0V) |
| | SUB-PIXEL DATA "0" (BLACK: NORMALLY BLACK) | LOW LEVEL (3V) | HIGH LEVEL (3V) |
| xGate(+) | | 6V (SELECTED) | 6V (NOT SELECTED) |
| Gate(+) | | 3V (SELECTED) | -3V (NOT SELECTED) |
| xGate(-) | | 9V (NOT SELECTED) | 3V (SELECTED) |
| Gate(-) | | 0V (NOT SELECTED) | 0V (SELECTED) |
| VMH(+) | | 6V | |
| VML(+) | | 3V | |
| VMH(-) | | 3V | |
| VML(-) | | 0V | |

FIG.26

| ROW \ COLUMN | | | FIRST COLUMN | SECOND COLUMN | THIRD COLUMN |
|---|---|---|---|---|---|
| FIRST ROW | FIRST MEMORY BLOCK | FIRST MEMORY | 1 (WHITE) | 0 (BLACK) | 0 (BLACK) |
| | | SECOND MEMORY | 0 (WHITE (INVERTED)) | 1 (BLACK (INVERTED)) | 1 (BLACK (INVERTED)) |
| | SECOND MEMORY BLOCK | FIRST MEMORY | 0 (BLACK) | 1 (WHITE) | 0 (BLACK) |
| | | SECOND MEMORY | 1 (BLACK (INVERTED)) | 0 (WHITE (INVERTED)) | 1 (BLACK (INVERTED)) |

DISPLAY DEVICE AND ELECTRONIC SIGNBOARD

CROSS-REFERENCE TO RELATED APPLICATION

This application claims the benefit of priority from Japanese Patent Application No. 2018-180951 filed on Sep. 26, 2018 and International Patent Application No. PCT/JP2019/025247 filed on Jun. 25, 2019, the entire contents of which are incorporated herein by reference.

BACKGROUND

1. Technical Field

The present disclosure relates to a display device and an electronic signboard.

2. Description of the Related Art

A display device for displaying an image includes a plurality of pixels. Japanese Patent Application Laid-open Publication No. H9-212140 (JP-A-H9-212140) discloses what is called a Memory-in-Pixel (MIP) type display device in which each of the pixels includes a memory. In the display device disclosed in JP-A-H9-212140, each of the pixels includes a plurality of memories and a circuit that switches between the memories. Japanese Patent Application Laid-open Publication No. S58-196582 (JP-A-S58-196582) discloses a display element including a single-bit memory. Japanese Patent No. 2685770 (JP 2685770) discloses a non-volatile semiconductor storage device.

In the display device disclosed in JP-A-H9-212140, a dynamic random access memory (DRAM) or a static random access memory (SRAM) is used as each memory in each pixel. The DRAM requires a refresh operation and is not suitable for reducing power consumption. The SRAM has a large circuit scale, and it is difficult to achieve high definition.

For the foregoing reasons, there is a need for a display device and an electronic signboard that can achieve high definition.

SUMMARY

According to an aspect, a display device includes a plurality of sub-pixels. Each of the sub-pixels includes a memory block including a memory configured to store therein sub-pixel data and a sub-pixel electrode coupled to the memory block. The memory includes first and second transistors configured to store therein the sub-pixel data in accordance with an electrical charge of a floating gate, the first and second transistors include respective drains that are coupled to each other, and a coupling point of the drains is coupled to a node. The sub-pixel electrode is coupled to the node, and each of the sub-pixels is configured to display an image based on a potential of the node.

According to another aspect, an electronic signboard includes a plurality of sub-pixels. Each of the sub-pixels includes a memory block including a memory configured to store therein sub-pixel data and a sub-pixel electrode coupled to the memory block. The memory includes first and second transistors configured to store therein the sub-pixel data in accordance with an electrical charge of a floating gate, the first and second transistors include respective drains that are coupled to each other, and a coupling point of the drains is coupled to a node. The sub-pixel electrode is coupled to the node, and each of the sub-pixels is configured to display an image based on a potential of the node.

BRIEF DESCRIPTION OF THE DRAWINGS

FIG. 7 is a truth table of the memory in the display device of the first aspect of the first embodiment;

FIG. 8 is a table illustrating an operation of the memory in the display device of the first aspect of the first embodiment;

FIG. 12 is a table illustrating the potentials to be applied to a memory block in the display device of the first aspect of the first embodiment;

FIG. 13 is a diagram illustrating sub-pixel data to be written to the sub-pixel in the display device of the first aspect of the first embodiment;

FIG. 15 is a diagram illustrating the potentials of the elements in writing to the sub-pixel in the display device of the first aspect of the first embodiment;

FIG. 20A is a diagram illustrating a relation between data of the sub-pixel and an electric field of liquid crystal molecules in the display device of the first aspect of the first embodiment;

FIG. 20B is a diagram illustrating a relation between data of the sub-pixel and an electric field of liquid crystal molecules in the display device of the first aspect of the first embodiment;

FIG. 21 is a diagram illustrating the potentials of the elements in reading from the sub-pixel in the display device of the first aspect of the first embodiment;

FIG. 22 is a diagram illustrating the number of transistors in the sub-pixel in the display device of the first embodiment, and the number of transistors in the display element in Japanese Patent Application Laid-open Publication No. S58-196582 (JP-A-S58-196582);

FIG. 23 is a diagram illustrating a circuit configuration of a display device of a second aspect of the first embodiment;

FIG. 24 is a table illustrating the potentials to be applied to a memory block in the display device of the second aspect of the first embodiment;

FIG. 26 is a diagram illustrating sub-pixel data to be written to the sub-pixel in the display device of the second embodiment;

DETAILED DESCRIPTION

Figure 1A:
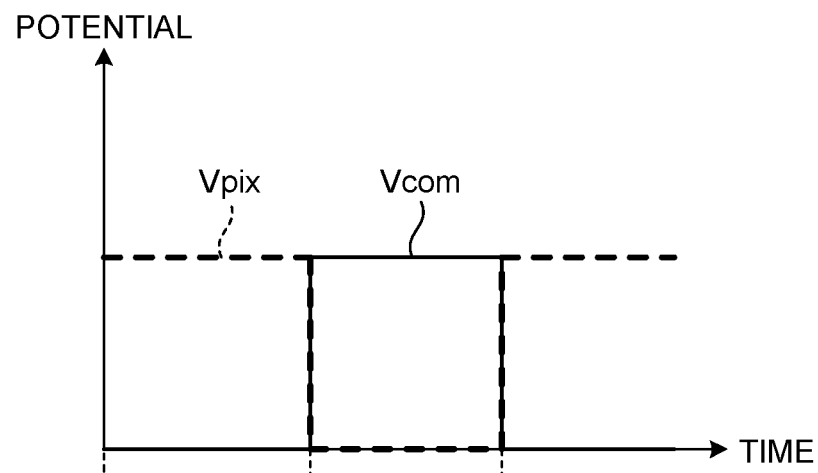
FIG. 1A is a diagram illustrating the potentials of a common electrode and a sub-pixel electrode of a display device of a first embodiment.

Modes (embodiments) for carrying out the present disclosure will be described in detail with reference to the accompanying drawings. However, the present disclosure is not limited to the contents described in the following embodiments. Components described below include components that can be easily assumed by those skilled in the art, and components that are substantially the same as those components. The components described below can be combined with one another as appropriate. What is disclosed herein is merely an example, and the present disclosure naturally encompasses an appropriate modification maintaining the gist of the disclosure that is easily conceivable by those skilled in the art. To further clarify the description, a width, a thickness, a shape, and the like of each component may be schematically illustrated in the drawings as compared with an actual aspect. However, this is merely an example, and interpretation of the present disclosure is not limited thereto. The same element as that described in the drawing that has already been discussed is denoted by the same reference numeral through the present specification and the drawings, and detailed description thereof may be omitted in some cases.

In this disclosure, when an element is described as being "on" another element, the element can be directly on the other element, or there can be one or more elements between the element and the other element.

First Embodiment

Driving Method

Prior to describing the details of the first embodiment, a driving method of the first embodiment will be described.

Known driving methods for preventing screen burn-in on a liquid crystal display device include a column inversion driving method, a line inversion driving method, a dot inversion driving method, a frame inversion driving method, and the like.

In the first embodiment, a display device adopts the frame inversion driving method. The frame inversion driving method is a driving method in which a potential difference between a common electrode and a sub-pixel electrode is inverted every certain period. Examples of the frame inversion driving method include (1) a driving method in which the potential of a common electrode and the potential of a sub-pixel electrode are synchronously inverted (hereinafter, referred to as a "common inversion driving method"), and (2) a driving method in which the potential of a common electrode is kept constant, and only the potential of a sub-pixel electrode is inverted at a predetermined cycle (hereinafter, referred to as a "common constant driving method").

Figure 1B:
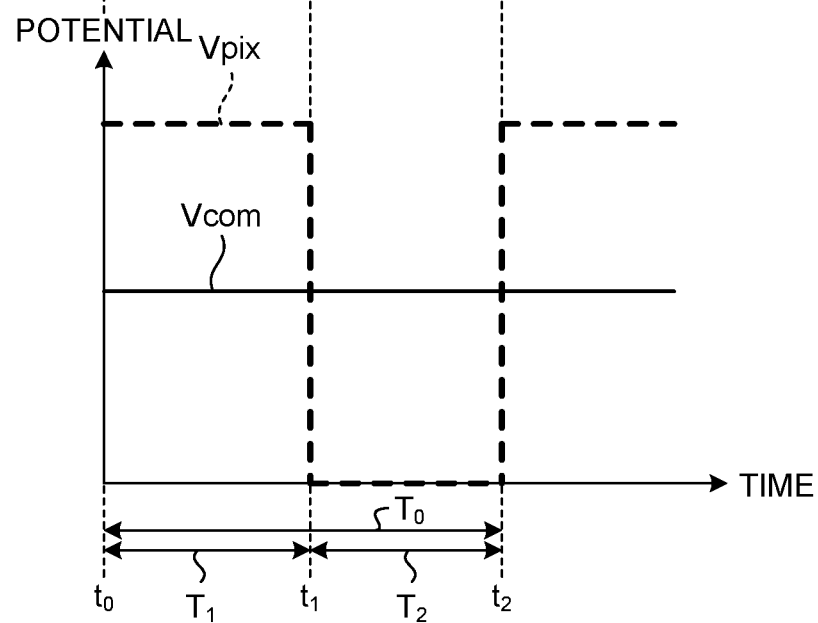
FIG. 1B is a diagram illustrating the potentials of the common electrode and the sub-pixel electrode of the display device of the first embodiment.

FIG. 1A and FIG. 1B are diagrams illustrating the potentials of the common electrode and the sub-pixel electrode of the display device of the first embodiment. FIG. 1A is a diagram illustrating the potential of the common electrode and the potential of the sub-pixel electrode in the common inversion driving method. FIG. 1B is a diagram illustrating the potential of the common electrode and the potential of the sub-pixel electrode in the common constant driving method.

Referring to FIG. 1A, in the common inversion driving method, the common potential Vcom of the common electrode is at a low level (for example, 0V) during a period $T_1$ from the timing to $t_0$ the timing $t_1$ and is at a high level (for example, 3V) during a period $T_2$ from the timing $t_1$ to the timing $t_2$. On the other hand, the potential Vpix of the sub-pixel electrode is at a high level during the period $T_1$ and is at a low level during the period $T_2$. In this manner, in the common inversion driving method, the common potential Vcom of the common electrode and the potential Vpix of the sub-pixel electrode are synchronously inverted, whereby the polarity of the voltage applied to the liquid crystal molecules is inverted. Consequently, screen burn-in is hampered.

Referring to FIG. 1B, in the common constant driving method, the common potential Vcom of the common electrode is constant (for example, 3V). On the other hand, the potential Vpix of the sub-pixel electrode is at a higher level (for example, 6V) than the common potential Vcom of the common electrode during the period $T_1$ and is at a lower level (for example, 0V) than the common potential Vcom of the common electrode during the period $T_2$. In this manner, in the common constant driving method, the common potential Vcom of the common electrode is kept constant, and only the potential Vpix of the sub-pixel electrode is inverted at a predetermined cycle, whereby the polarity of the voltage applied to the liquid crystal molecules is inverted. Consequently, screen burn-in is hampered.

In the first embodiment, the display device is operated in what is called a normally black mode in which a black color is displayed when voltage is not applied to the liquid crystal molecules, and a white color is displayed when voltage is applied to the liquid crystal molecules. In the normally black mode, a black color is displayed when the potential of the sub-pixel electrode and the common potential are in phase (equipotential), and a white color is displayed when the potential of the sub-pixel electrode and the common potential are out of phase. In the out-of-phase mode, opposite phase is the most preferable phase. However, the present disclosure is not limited thereto, and the display device may be in what is called a normally white mode in which a white color is displayed when voltage is not applied to the liquid crystal molecules, and a black color is displayed when voltage is applied to the liquid crystal molecules.

In FIG. 1A and FIG. 1B, a potential difference is generated between the sub-pixel electrode and the common electrode. In other words, because voltage is applied to the liquid crystal molecules, a white color is displayed.

In a first aspect of the first embodiment, the common inversion driving method is adopted. In a second aspect of the first embodiment, the common constant driving method is adopted.

A period $T_0$ from the timing $t_0$ to the timing $t_2$ in FIG. 1 is referred to as one frame period. The period $T_1$ in FIG. 1 is referred to as a "plus field period", and the period $T_2$ in FIG. 1 is referred to as a "minus field period". The plus field period corresponds to a first field period in the present disclosure, and the minus field period corresponds to a second field period in the present disclosure.

First Aspect of First Embodiment

Entire Configuration

Figure 2:
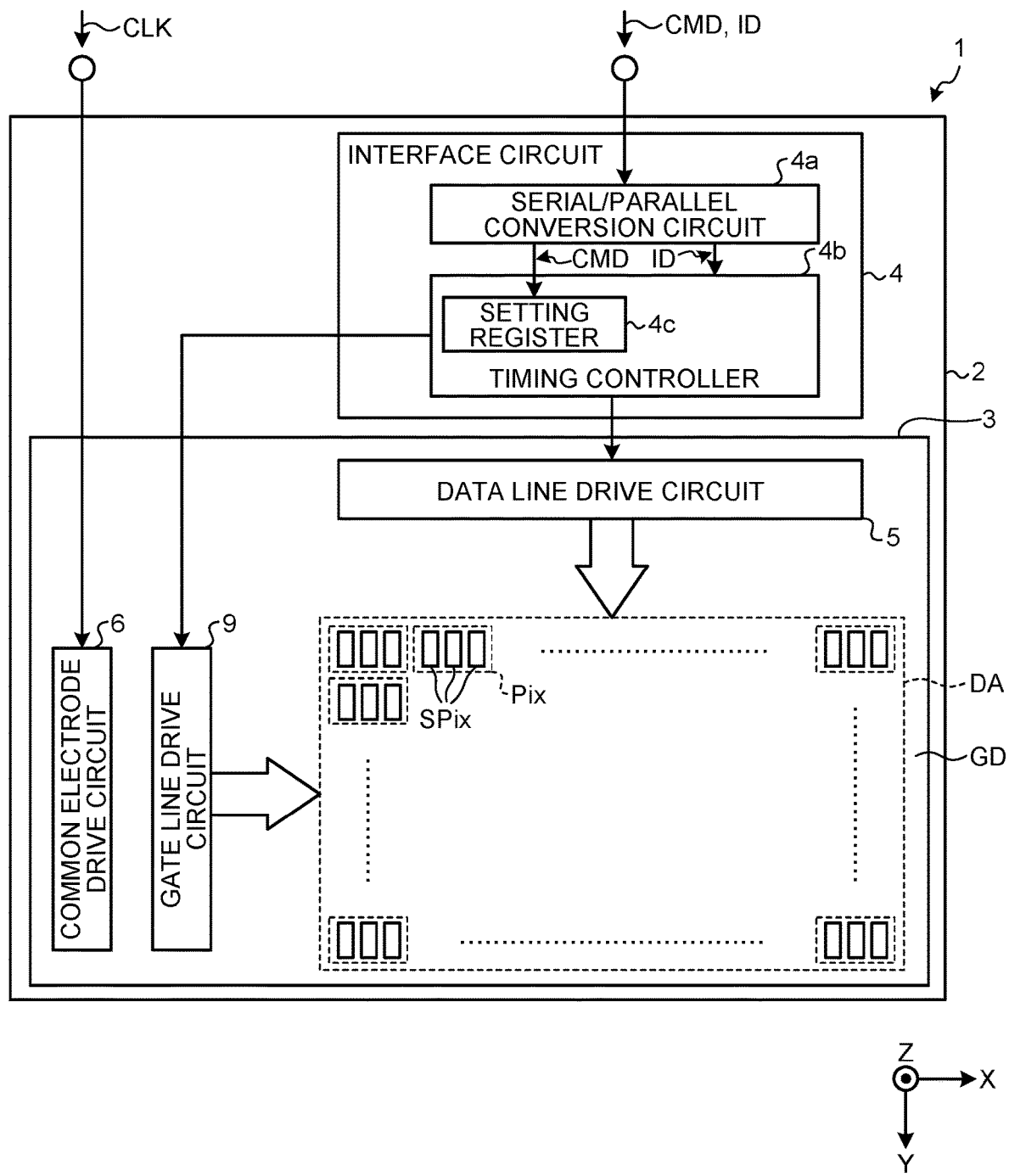
FIG. 2 is a schematic diagram of the entire configuration of a display device of a first aspect of the first embodiment.

FIG. 2 is a schematic diagram of the entire configuration of the display device of the first aspect of the first embodiment. A display device 1 includes a first panel 2 and a second panel 3 disposed opposite to the first panel 2. The display device 1 includes a display area DA that displays an image and a frame area GD that is arranged outside of the display area DA. In the display area DA, a liquid crystal layer is sealed between the first panel 2 and the second panel 3.

In the first aspect of the first embodiment, the display device 1 is a liquid crystal display device using a liquid crystal layer. However, the present disclosure is not limited thereto. The display device 1 may be an organic electroluminescence (EL) display device using organic EL elements instead of the liquid crystal layer.

In the display area DA, a plurality of pixels Pix are arranged in a matrix (row-column configuration) of N columns (N is a natural number) in an X direction and M rows (M is a natural number) in a Y direction. The X direction is parallel to the main surfaces of the first panel 2 and the second panel 3, and the Y direction is parallel to the main surfaces of the first panel 2 and the second panel 3 and intersects with the X direction. In the frame area GD, an interface circuit 4, a data line drive circuit 5, a common electrode drive circuit 6, and a gate line drive circuit 9 are disposed. It is possible to adopt a configuration in which the interface circuit 4, the data line drive circuit 5, and the common electrode drive circuit 6 among the plurality of circuits are incorporated in an IC chip, and the gate line drive circuit 9 is formed on the first panel 2. Alternatively, it is possible to adopt a configuration in which a group of circuits incorporated in an IC chip is formed on a processor located outside of the display device 1, and the group of circuits is coupled to the display device 1.

Each of the M×N pixels Pix includes a plurality of sub-pixels SPix. In the first aspect of the first embodiment, there are three sub-pixels SPix of red (R), green (G), and blue (B). However, the present disclosure is not limited thereto. There may be four sub-pixels SPix including white (W) in addition to red (R), green (G), and blue (B). Alternatively, there may be five or more sub-pixels SPix in different colors.

Since each pixel Pix includes three sub-pixels SPix, M×N×3 sub-pixels SPix are arranged in the display area DA. The three sub-pixels SPix in each pixel Pix are arranged in the X direction, and therefore N×3 sub-pixels SPix are arranged in one row.

As will be described later, each sub-pixel SPix includes a first memory and a second memory. Thus, N×3×2 memories are arranged in one row. M×N×3×2 memories are arranged in the display area DA.

Each sub-pixel SPix displays an image on the basis of sub-pixel data stored in the first memory and the second memory. The first memory is used for displaying an image during the plus field period, and the second memory is used for displaying an image during the minus field period.

In other words, a set of M×N×3×2 memories included in the M×N×3 sub-pixels SPix is equivalent to one frame memory.

The interface circuit 4 includes a serial-to-parallel conversion circuit 4a and a timing controller 4b. The timing controller 4b includes a setting register 4c. Command data CMD and image data ID are supplied to the serial-to-parallel conversion circuit 4a from an external circuit in a form of serial data. For example, the external circuit is a host central processing unit (CPU) or an application processor. However, the present disclosure is not limited thereto.

The serial-to-parallel conversion circuit 4a converts the supplied command data CMD to parallel data and outputs the parallel data to the setting register 4c. In the setting register 4c, a value used for controlling the data line drive circuit 5 and the gate line drive circuit 9 is set on the basis of the command data CMD.

The serial-to-parallel conversion circuit 4a converts the supplied image data ID to parallel data and outputs the parallel data to the timing controller 4b. The timing controller 4b outputs the image data ID to the data line drive circuit 5, on the basis of the value set in the setting register 4c. The timing controller 4b controls the gate line drive circuit 9 on the basis of the value set in the setting register 4c.

A reference clock signal CLK is supplied to the common electrode drive circuit 6 from an external circuit. For example, the external circuit is a clock generator. However, the present disclosure is not limited thereto.

In the first aspect of the present embodiment, the display device 1 adopts the common inversion driving method. Since the display device 1 adopts the common inversion driving method, the common electrode drive circuit 6 inverts the potential of the common electrode (common potential) in synchronization with the reference clock signal CLK. Consequently, the display device 1 can implement the common inversion driving method.

The sub-pixel data needs to be stored in the memories of the sub-pixels SPix to display an image on the display device 1. In order to store the sub-pixel data in each memory, the gate line drive circuit 9 outputs a gate signal to select one row from the M×N pixels Pix under the control of the timing controller 4b.

As will be described later, each of the first memories and the second memories in the sub-pixels SPix is selected and operated by a gate signal and an inverted gate signal corresponding to a signal obtained by inverting the gate signal. Thus, two gate lines and two inverted gate lines are disposed per each pixel row (sub-pixel row).

The two gate lines and the two inverted gate lines disposed per each pixel row correspond to a gate line group in the present disclosure. Since the display device 1 includes the pixels Pix of M rows, M gate line groups are disposed.

The gate line drive circuit 9 includes M×4 output terminals corresponding to the M gate line groups. The gate line drive circuit 9 sequentially outputs, from the M×4 output terminals, the gate signal and the inverted gate signal for selecting one pixel row, under the control of the timing controller 4b.

As will be described later, each of the first memory and the second memory of each sub-pixel SPix is operated by a data signal (source signal, sub-pixel data) and an inverted data signal (inverted source signal, inverted sub-pixel data) corresponding to a signal obtained by inverting the data signal. Thus, a data line and an inverted data line are disposed per each sub-pixel column.

The data line and the inverted data line disposed per each sub-pixel column correspond to a data line group in the present disclosure. Since the display device 1 includes the sub-pixels SPix of N×3 columns, N×3 data line groups are disposed.

The data line drive circuit 5 outputs the data signal and the inverted data signal to the memories selected by the gate signal, under the control of the timing controller 4b. Consequently, the sub-pixel data is sequentially stored in each memory.

In the display device 1, the pixels Pix of M rows are line-sequentially scanned, whereby the sub-pixel data of the one frame data is stored in the first memory and the second memory of each sub-pixel SPix.

Cross-Sectional Structure

Figure 3:
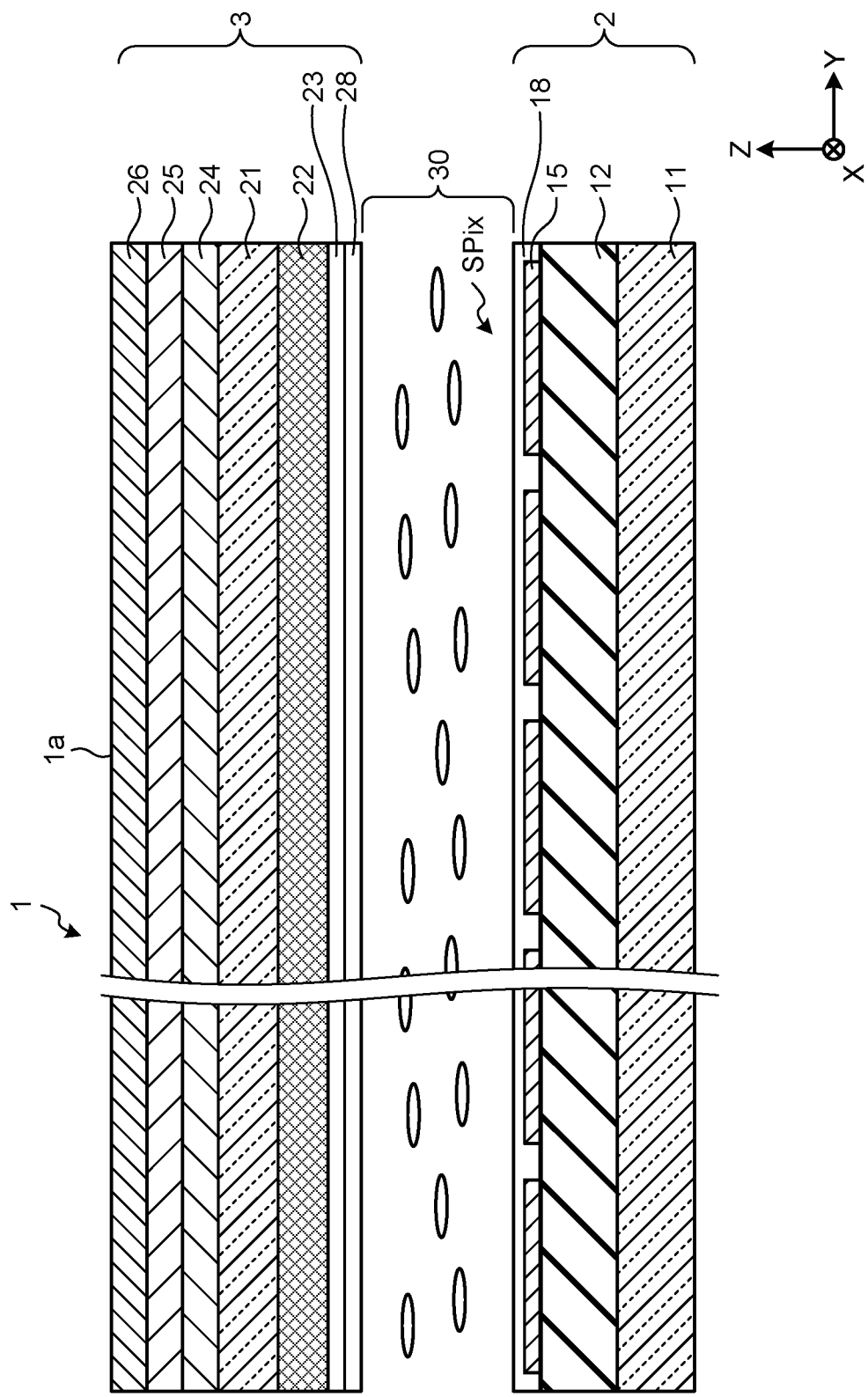
FIG. 3 is a sectional view of the display device of the first aspect of the first embodiment.

FIG. 3 is a sectional view of the display device of the first aspect of the first embodiment. As illustrated in FIG. 3, the display device 1 includes the first panel 2, the second panel 3, and a liquid crystal layer 30. The second panel 3 is disposed opposite to the first panel 2. The liquid crystal layer 30 is provided between the first panel 2 and the second panel 3. One main surface of the second panel 3 is a display surface 1a for displaying an image.

Light incident from the outside on the display surface 1a side is reflected by a sub-pixel electrode (reflective electrode) 15 of the first panel 2 and is emitted from the display surface 1a. The display device 1 is a reflective-type liquid crystal display device that displays an image on the display surface 1a using the reflected light. In the present specification, the direction parallel to the display surface 1a is referred to as the X direction, and the direction intersecting the X direction on the surface parallel to the display surface 1a is referred to as the Y direction. The direction perpendicular to the display surface 1a is referred to as the Z direction.

The first panel 2 includes a first substrate 11, an insulation layer 12, the sub-pixel electrode 15, and an orientation film 18. For example, the first substrate 11 is a glass substrate or a resin substrate. Circuit elements, which are not illustrated, and various wiring such as the gate lines and the data lines are provided on the surface of the first substrate 11. The circuit elements include a switching element such as a thin film transistor (TFT) and a capacitive element.

The insulation layer 12 is provided on the first substrate 11 and flattens the surfaces of the circuit elements, various wiring, and the like as a whole. A plurality of the sub-pixel electrodes 15 are provided on the insulation layer 12. The orientation film 18 is provided between the sub-pixel electrode 15 and the liquid crystal layer 30. The sub-pixel electrode 15 is formed in a rectangular shape and provided for each sub-pixel SPix. The sub-pixel electrode 15 is formed of metal such as aluminum (Al) or silver (Ag). The sub-pixel electrode 15 may have a configuration in which these metal materials and a translucent conductive material such as indium tin oxide (ITO) are layered on each other. The sub-pixel electrode 15 is formed of a material having excellent reflectivity and functions as a reflecting plate that reflects light from outside.

The second panel 3 includes a second substrate 21, a color filter 22, a common electrode 23, an orientation film 28, a ¼ wavelength plate 24, a ½ wavelength plate 25, and a polarization plate 26. On the surface that faces the first panel 2 of the two surfaces of the second substrate 21, the color filter 22 and the common electrode 23 are disposed in the order as listed. The orientation film 28 is provided between the common electrode 23 and the liquid crystal layer 30. The ¼ wavelength plate 24, the ½ wavelength plate 25, and the polarization plate 26 are layered in the order as listed, on the surface of the second substrate 21 on the display surface 1a side.

For example, the second substrate 21 is a glass substrate or a resin substrate. The common electrode 23 is formed of a translucent conductive material such as ITO. The common electrode 23 is disposed opposite to the sub-pixel electrodes 15 and supplies a common potential to the sub-pixels SPix. For example, the color filter 22 includes three color filters of red (R), green (G), and blue (B). However, the present disclosure is not limited thereto. The color filter 22 may also include white (W) in addition to the colors described above. It is also possible to adopt a configuration in which the color filter is not used. In this case, a pixel is formed in units of sub-pixels.

For example, the liquid crystal layer 30 includes a nematic liquid crystal. In the liquid crystal layer 30, the orientation of the liquid crystal molecules is changed when the voltage level (potential difference) between the common electrode 23 and the sub-pixel electrode 15 is changed. Consequently, light that passes through the liquid crystal layer 30 is modulated for each sub-pixel SPix.

The external light or the like becomes incident light that enters from the display surface 1a side of the display device 1, passes through the second panel 3 and the liquid crystal layer 30, and reaches the sub-pixel electrode 15. The incident light is then reflected by the sub-pixel electrode 15 of the sub-pixel SPix. The reflected light is modulated by each sub-pixel SPix and is emitted from the display surface 1a. Consequently, an image is displayed.

Circuit Configuration

Figure 4:
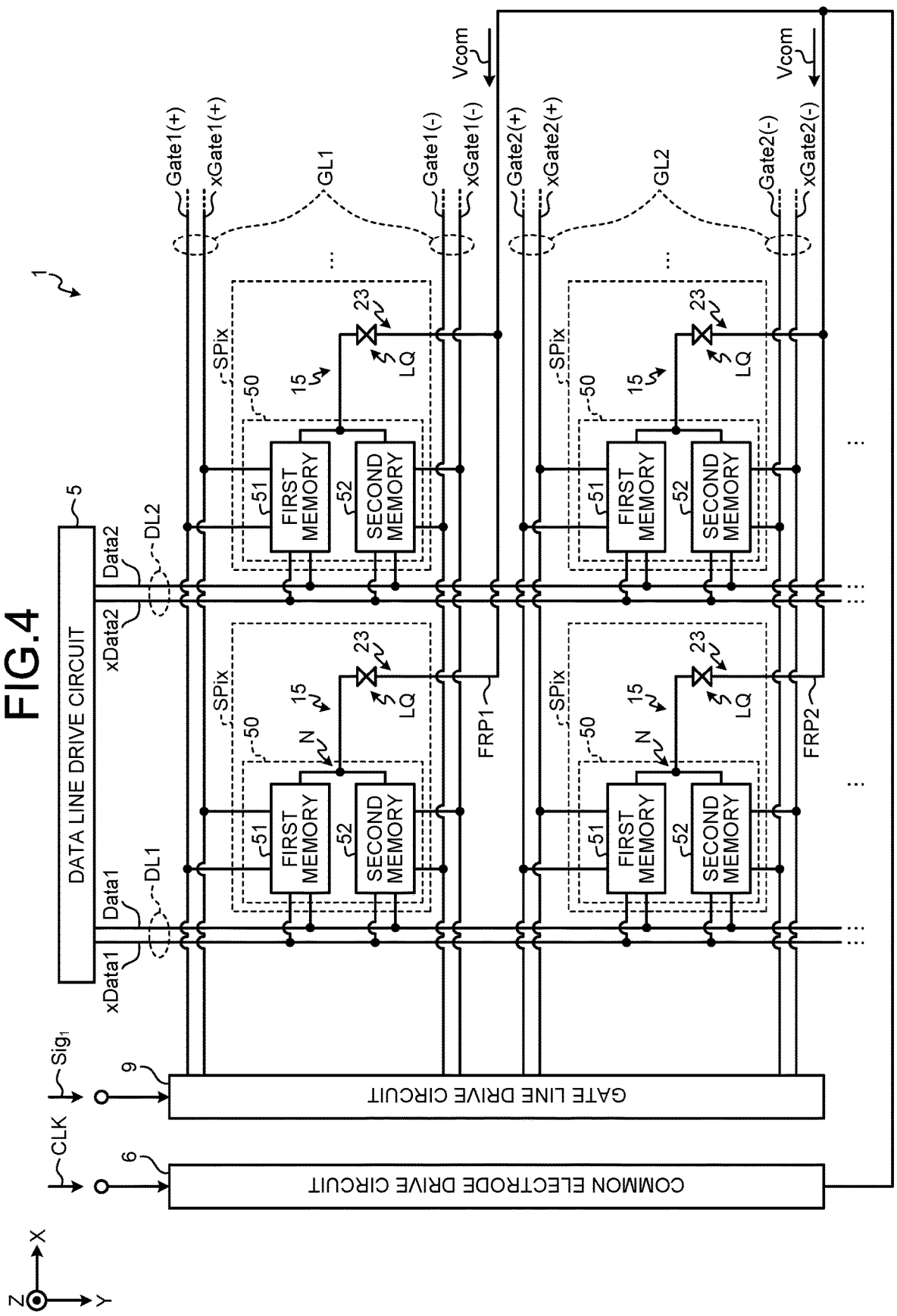
FIG. 4 is a diagram illustrating a circuit configuration of the display device of the first aspect of the first embodiment.

FIG. 4 is a diagram illustrating a circuit configuration of the display device of the first aspect of the first embodiment. FIG. 4 illustrates 2×2 sub-pixels SPix in the sub-pixels SPix of M rows×(N×3) columns.

The sub-pixel SPix includes a memory block 50, liquid crystal LQ (liquid crystal layer 30), and a sub-pixel electrode 15 (see FIG. 2). The memory block 50 includes a first memory 51 and a second memory 52.

The common electrode drive circuit 6 inverts the common potential Vcom common to the sub-pixels SPix in synchronization with the reference clock signal CLK and outputs the resulting potential to the common electrode 23 (see FIG. 2) via common potential lines FRP1, FRP2, . . . . The common electrode drive circuit 6 may output the reference clock signal CLK to the common electrode 23 directly, as the common potential Vcom. Alternatively, the common electrode drive circuit 6 may output the reference clock signal CLK to the common electrode 23 via a buffer circuit for amplifying the current driving capability, as the common potential Vcom. For example, as the common potential Vcom during a display period, a pair of voltages 3V and 0V, which will be described later, will be used. The common electrode drive circuit 6 inverts the voltage of the common potential Vcom so as to change the voltage from one voltage to the other in accordance with the reference clock signal CLK. When the common electrode drive circuit 6 repeats this process, an alternating current (AC) common signal is generated and is supplied to the common potential lines FRP1, FRP2, . . . .

The gate line drive circuit 9 includes M×4 output terminals corresponding to the M gate line groups. Based on a control signal $Sig_1$ supplied from the timing controller 4b, the gate line drive circuit 9 outputs, from the M×4 output terminals, the gate signal and the inverted gate signal for selecting a memory row.

The gate line drive circuit 9 may be a scanner circuit that sequentially outputs the gate signal from the M output terminals on the basis of the control signal $Sig_1$ (a scan start signal and a clock pulse signal). Alternatively, the gate line drive circuit 9 may be a decoder circuit that decodes an encoded control signal $Sig_1$ and that outputs the gate signal to the output terminal specified by the decoded control signal $Sig_1$.

M gate line groups GL1, GL2, . . . are disposed on the first panel 2, corresponding to the sub-pixels SPix of M rows. The M gate line groups GL1, GL2, . . . extend along the X direction in the display area DA (see FIG. 2).

The first gate line group GL1 includes a gate line Gate1(+) and an inverted gate line xGate1(+) electrically coupled to the first memories 51 in the first sub-pixel row. The first gate line group GL1 includes a gate line Gate1(−) and an inverted gate line xGate1(−) electrically coupled to the second memories 52 in the first sub-pixel row.

The second gate line group GL2 includes a gate line Gate2(+) and an inverted gate line xGate2(+) electrically coupled to the first memories 51 in the second sub-pixel row. The second gate line group GL2 includes a gate line Gate2(−) and an inverted gate line xGate2(−) electrically coupled to the second memories 52 in the second sub-pixel row.

N×3 data line groups DL1, DL2, . . . are disposed on the first panel 2 corresponding to the sub-pixels SPix of N×3 columns. The N×3 data line groups DL1, DL2, . . . extend along the Y direction in the display area DA (see FIG. 2).

The first data line group DL1 includes a data line Data1 and an inverted data line xData1 electrically coupled to the first memories 51 and the second memories 52 in the first sub-pixel column.

The second data line group DL2 includes a data line Data2 and an inverted data line xData2 electrically coupled to the first memories 51 and the second memories 52 in the second sub-pixel column.

The data line drive circuit 5 outputs data signals and inverted data signals to the first memories 51 and the second memories 52 in the sub-pixels SPix selected by the gate signal, via the data line groups DL1, DL2, . . . .

The first memories 51 and the second memories 52 in the sub-pixel row to which the gate signal and the inverted gate signal are supplied, store therein sub-pixel data corresponding to the data signals and the inverted data signals supplied to the data line group DL.

The first memory 51 and the second memory 52 of the sub-pixel alternately output a potential corresponding to the stored sub-pixel data to the sub-pixel electrode 15 via a node N.

Figure 5:
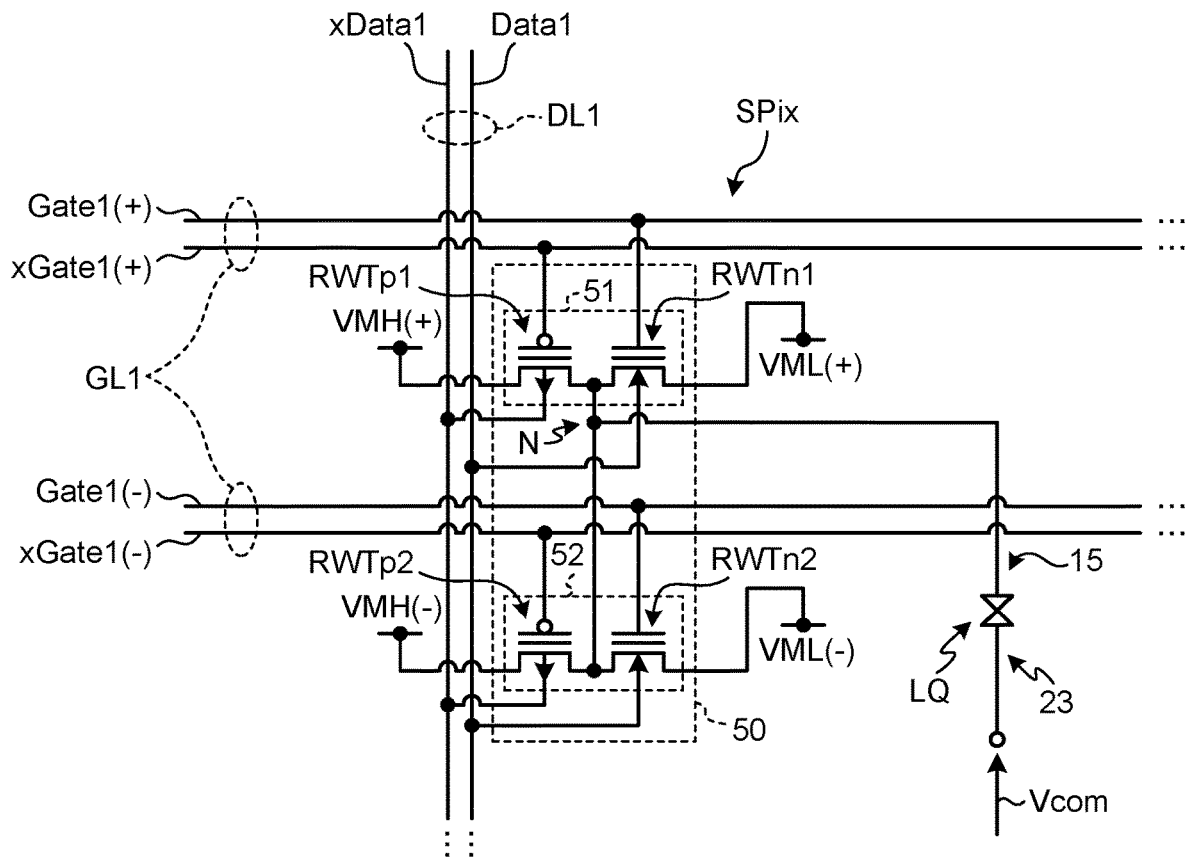
FIG. 5 is a diagram illustrating a circuit configuration of a sub-pixel in the display device of the first aspect of the first embodiment.

FIG. 5 is a diagram illustrating a circuit configuration of the sub-pixel in the display device of the first aspect of the first embodiment. FIG. 5 illustrates one sub-pixel SPix.

The sub-pixel SPix includes the memory block 50 and the liquid crystal LQ. The memory block 50 includes the first memory 51 and the second memory 52.

The first memory 51 includes a P-channel type transistor RWTp1 and an N-channel type transistor RWTn1. The second memory 52 includes a P-channel type transistor RWTp2 and an N-channel type transistor RWTn2. Each of the transistor RWTp1, the transistor RWTn1, the transistor RWTp2, and the transistor RWTn2 includes a floating gate.

The gate (refers to a control gate. Hereinafter, unless otherwise specified, the term gate implies the control gate) of the transistor RWTp1 is coupled to the inverted gate line xGate1(+). The source of the transistor RWTp1 is coupled to a power supply potential VMH(+). The body (a portion in a semiconductor layer, particularly refers to a portion located opposite to the floating gate) of the transistor RWTp1 is coupled to the inverted data line xData1.

The gate of the transistor RWTn1 is coupled to the gate line Gate1(+). The source of the transistor RWTn1 is coupled to a power supply potential VML(+). The drain of the transistor RWTn1 is coupled to the drain of the transistor RWTp1. The body of the transistor RWTn1 is coupled to the data line Data1.

That is, the source-drain paths of the transistor RWTp1 and the transistor RWTn1 are coupled in series.

The transistor RWTp1 and the transistor RWTn1 store therein sub-pixel data "0" in a state in which electrons are extracted from the floating gate (a state in which positive holes are injected). On the other hand, the transistor RWTp1 and the transistor RWTn1 store therein sub-pixel data "1" in a state in which electrons are injected into the floating gate (a state in which positive holes are extracted).

The coupling point of the transistor RWTp1 and the transistor RWTn1 is coupled to the node N. The node N is coupled to the sub-pixel electrode (reflective electrode) 15 (see FIG. 3).

The gate of the transistor RWTp2 is coupled to the inverted gate line xGate1(−). The source of the transistor RWTp2 is coupled to a power supply potential VMH(−). The body of the transistor RWTp2 is coupled to the inverted data line xData1.

The gate of the transistor RWTn2 is coupled to the gate line Gate1 (−). The source of the transistor RWTn2 is coupled to a power supply potential VML(−). The drain of the transistor RWTn2 is coupled to the drain of the transistor RWTp2. The body of the transistor RWTn2 is coupled to the data line Data1.

That is, the source-drain paths of the transistor RWTp2 and the transistor RWTn2 are coupled in series.

The transistor RWTp2 and the transistor RWTn2 store therein the sub-pixel data "0" in a state in which electrons are extracted from the floating gate. On the other hand, the transistor RWTp2 and the transistor RWTn2 store therein the sub-pixel data "1" in a state in which electrons are injected into the floating gate.

The coupling point of the transistor RWTp2 and the transistor RWTn2 is coupled to the node N. The node N is coupled to the sub-pixel electrode (reflective electrode) 15.

Operation of Memory

Prior to describing the overall operation of the display device 1, operations of the first memory 51 and the second memory 52 will be described.

Figure 6:
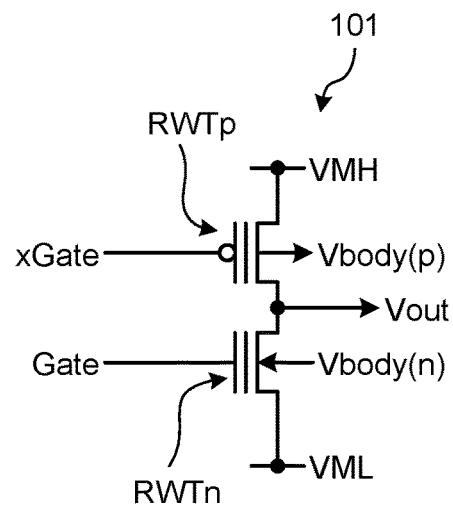
FIG. 6 is an equivalent circuit diagram of a memory in the display device of the first aspect of the first embodiment.

FIG. 6 is an equivalent circuit diagram of a memory in the display device of the first aspect of the first embodiment. A memory 101 illustrated in FIG. 6 is equivalent to each of the first memory 51 and the second memory 52 illustrated in FIG. 5.

FIG. 7 is a truth table of the memory in the display device of the first aspect of the first embodiment. More specifically, FIG. 7 is a truth table of the memory 101 illustrated in FIG.

6. In this example, it is assumed that power supply potential VMH=3V and power supply potential VML=0V.

In a state in which electrons are injected into the floating gates of the transistor RWTp and the transistor RWTn (sub-pixel data "1" is stored), the potential of the inverted gate line xGate is set to 3V, and the potential of the gate line Gate is set to 0V. In this case, the transistor RWTp is made to be in an ON state, and the transistor RWTn is made to be in an OFF state. Thus, an output potential Vout of the memory 101 becomes 3V (=VMH).

In a state in which electrons are extracted from the floating gates of the transistor RWTp and the transistor RWTn (sub-pixel data "0" is stored), the potential of the inverted gate line xGate is set to 3V, and the potential of the gate line Gate is set to 0V. In this case, the transistor RWTp is made to be in an OFF state, and the transistor RWTn is made to be in an ON state. Consequently, the output potential Vout of the memory 101 becomes 0V (=VML).

That is, when the memory 101 is selected, the transistor RWTp and the transistor RWTn operate complementarily.

The potential of the inverted gate line xGate is set to 6V, and the potential of the gate line Gate is set to −3V. In this case, both of the transistor RWTp and the transistor RWTn are made to be in an OFF state. Thus, the output potential Vout of the memory 101 becomes unstable (floating state).

The reason why the memory 101 operates as described in the truth table in FIG. 7 will be described below.

FIG. 8 is a table illustrating an operation of the memory 101. More specifically, FIG. 8 is a table illustrating ON and OFF of the transistors RWTp and RWTn in a combination of (1) a state in which electrons are injected into the floating gates of the transistor RWTp and the transistor RWTn (sub-pixel data "1" is stored) or a state in which electrons are extracted from the floating gates of the transistor RWTp and the transistor RWTn (sub-pixel data "0" is stored), and (2) a state in which the memory 101 is selected (output logic generation state) or a state in which the memory 101 is not selected (output floating state).

In a state in which electrons are injected into the floating gates of the transistor RWTp and the transistor RWTn (sub-pixel data "1" is stored), the operating voltage between the gate and the source of the transistor RWTp is in a range lower than 1V. That is, when the gate-source voltage of the transistor RWTp is equal to or less than 1V, the transistor RWTp is made to be in an ON state. In other words, it is Vth(p)=1V. The operating voltage between the gate and the source of the transistor RWTn is in a range higher than 2V. That is, when the gate-source voltage of the transistor RWTn is equal to or greater than 2V, the transistor RWTn is made to be in an ON state. In other words, it is Vth(n)=2V.

In a state in which electrons are extracted from the floating gates of the transistor RWTp and the transistor RWTn (sub-pixel data "0" is stored), the operating voltage between the gate and the source of the transistor RWTp is in a range lower than −2V. That is, when the gate-source voltage of the transistor RWTp is equal to or less than −2V, the transistor RWTp is made to be in an ON state. In other words, it is Vth(p)=−2V. The operating voltage between the gate and the source of the transistor RWTn is in a range higher than −1V. That is, when the gate-source voltage of the transistor RWTn is equal to or greater than −1V, the transistor RWTn is made to be in an ON state. In other words, it is Vth(n)=−1V.

As above shown, in the following, the word "data" is used for information including a binary datum like "0" or "1".

In a state in which electrons are injected into the floating gates of the transistor RWTp and the transistor RWTn (sub-pixel data "1" is stored), the potential of the inverted gate line xGate is set to 3V, and the potential of the gate line Gate is set to 0V. In this case, the transistor RWTp is made to be in an ON state because Vth is equal to or less than 1V when (gate-source voltage)=0V. The transistor RWTn is made to be in an OFF state because Vth is equal to or less than 2V when (gate-source voltage)=0V. Thus, the output potential Vout of the memory 101 becomes 3V (=VMH).

In a state in which electrons are extracted from the floating gates of the transistor RWTp and the transistor RWTn (sub-pixel data "0" is stored), the potential of the inverted gate line xGate is set to 3V, and the potential of the gate line Gate is set to 0V. In this case, the transistor RWTp is made to be in an OFF state because Vth is equal to or greater than −2V when (gate-source voltage)=0V. The transistor RWTn is made to be in an ON state because Vth equal to or greater than −1V when (gate-source voltage)=0V. Thus, the output potential Vout of the memory 101 becomes 0V (=VML).

A case in which the potential of the inverted gate line xGate is 6V and the potential of the gate line Gate is −3V (when the memory 101 is not selected) will now be considered. In this case, the transistor RWTp is always turned OFF because (gate-source voltage)=3V. The transistor RWTn is always turned OFF because (gate-source voltage)=−3V. Thus, the output potential Vout of the memory 101 becomes unstable (floating state).

The reason why the transistors RWTp and RWTn of the memory 101 operate as described in the table in FIG. 8 will be described below.

Figures 9, 10:
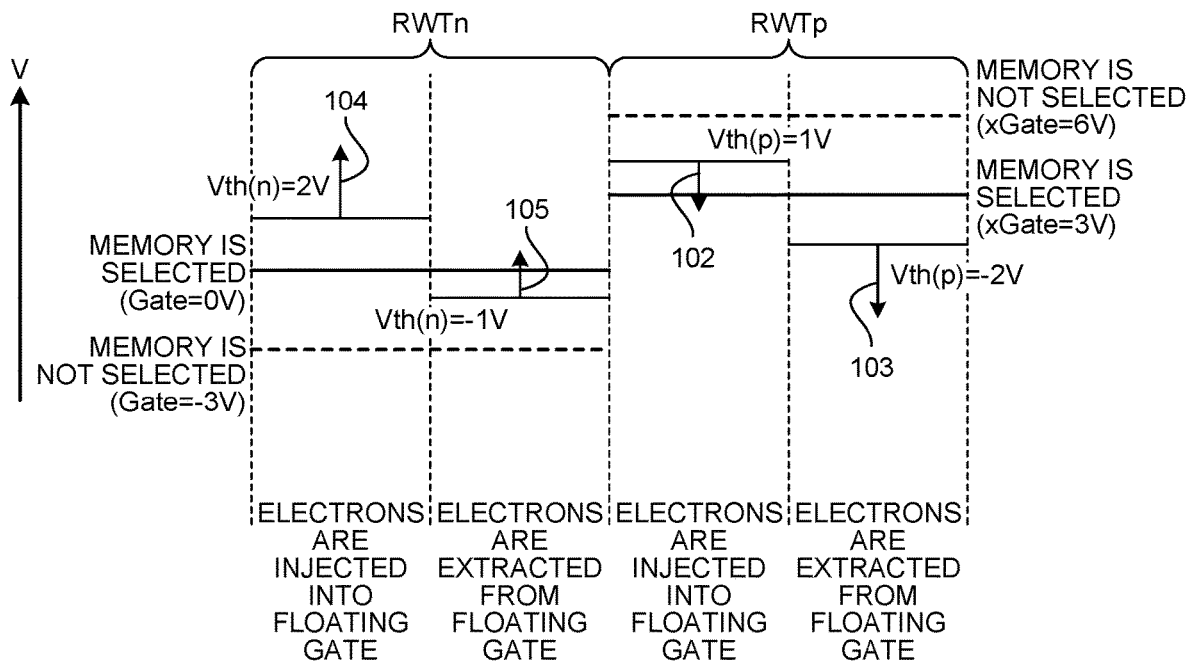
FIG. 9 is a diagram illustrating the gate potentials of transistors of the memory in the display device of the first aspect of the first embodiment.
FIG. 10 is a table illustrating conditions of injecting and extracting electrons to and from a floating gate of the transistor in the memory in the display device of the first aspect of the first embodiment.

FIG. 9 is a diagram illustrating the gate potentials of the transistor RWTp and the transistor RWTn of the memory 101 illustrated in FIG. 6. As described above, it is assumed that the power supply voltages VMH=3V and VML=0V.

FIG. 9 illustrates ranges of the gate-source voltage in which the transistor RWTp and the transistor RWTn will be made to be in an ON state by arrows 102, 103, 104, and 105. The voltage Vth(p) is a boundary gate-source voltage at which the transistor RWTp is turned ON. The voltage Vth(n) is a boundary gate-source voltage at which the transistor RWTn is turned ON.

In the transistor RWTp, the range not higher than Vth(p)=1V indicated by the arrow 102 is a range in which the gate potential is lower than 4V. The range not higher than Vth(p)=−2V indicated by the arrow 103 is a range in which the gate potential is lower than 1V. In the transistor RWTn, the range not lower than Vth(n)=2V indicated by the arrow 104 is a range in which the gate potential is higher than 2V. The range not lower than Vth(n)=−1V indicated by the arrow 105 is a range in which the gate potential is higher than −1V.

In a state in which electrons are injected into the floating gates of the transistor RWTp and the transistor RWTn (sub-pixel data "1" is stored), the operating voltage between the gate and the source of the transistor RWTp is in the range lower than 1V, indicated by the arrow 102. That is, when the gate-source voltage of the transistor RWTp is equal to or less than Vth(p)=1V, the transistor RWTp is made to be in an ON state. The operating voltage between the gate and the source of the transistor RWTn is in the range higher than 2V, indicated by the arrow 104. That is, when the gate-source voltage of the transistor RWTn is equal to or greater than Vth(n)=2V, the transistor RWTn is made to be in an ON state.

In this process, when the memory 101 is selected (xGate=3V and Gate=0V), the gate-source voltage of the transistor RWTp becomes 0V, and the gate-source voltage of the transistor RWTn becomes 0V. Thus, the gate-source voltage of the transistor RWTp is in the operating range indicated by the arrow 102. On the other hand, the gate-source voltage of the transistor RWTn is not in the operating range indicated by the arrow 104.

Thus, the transistor RWTp is made to be in an ON state, the transistor RWTn is made to be in an OFF state, and the output potential Vout of the memory 101 becomes 3V (=VMH).

On the other hand, in a state in which electrons are extracted from the floating gate (sub-pixel data "0" is stored), the operating voltage between the gate and the source of the transistor RWTp is in the range lower than −2V indicated by the arrow 103. That is, when the gate-source voltage of the transistor RWTp is equal to or less than Vth(p)=−2V, the transistor RWTp is made to be in an ON state. The operating voltage between the gate and the source of the transistor RWTn is in the range higher than −1V indicated by the arrow 105. That is, when the gate-source voltage of the transistor RWTn is equal to or greater than Vth(n)=−1V, the transistor RWTn is made to be in an ON state.

In this process, when the memory 101 is selected (xGate=3V and Gate=0V), the gate-source voltage of the transistor RWTp becomes 0V, and the gate-source voltage of the transistor RWTn becomes 0V. Thus, the gate-source voltage of the transistor RWTp will not be in the operating range indicated by the arrow 103. On the other hand, the gate-source voltage of the transistor RWTn will be in the operating range indicated by the arrow 105.

Thus, the transistor RWTp is made to be in an OFF state, the transistor RWTn is made to be in an ON state, and the output potential Vout of the memory 101 becomes 0V (=VML).

When the memory 101 is not selected (xGate=6V and Gate=−3V), the gate-source voltage of the transistor RWTp becomes 3V, and the gate-source voltage of the transistor RWTn becomes −3V.

Thus, the gate-source voltage of the transistor RWTp will not be in the operating ranges indicated by the arrow 102 and the arrow 103, regardless of the state in which electrons are injected into or extracted from the floating gate of the transistor RWTp. Similarly, the gate-source voltage of the transistor RWTn will not be in the operating ranges indicated by the arrow 104 and the arrow 105, regardless of the state in which electrons are injected into or extracted from the floating gate of the transistor RWTn.

Thus, the transistor RWTp is made to be in an OFF state, the transistor RWTn is made to be in an OFF state, and the output potential Vout of the memory 101 becomes unstable (floating state).

In this example, the potential Vbody(p) of the body of the transistor RWTp is set to power supply potential VMH=3V, and the potential of the potential Vbody(n) of the body of the transistor RWTn is set to power supply potential VML=0V. However, the present disclosure is not limited thereto. For example, power supply potential VMH=6V is also applicable. In this case, to set the potential Vbody(p) to 6V, xGate when the memory 101 is selected is set to 6V, and xGate when the memory 101 is not selected is set to 9V.

FIG. 10 is a table illustrating conditions of injecting and extracting electrons to and from a floating gate of the transistor in the memory in the display device of the first aspect of the first embodiment.

For example, by applying 20V between the gates and the bodies of the transistors RWTp and RWTn, it is possible to generate a high electric field between the floating gates and the bodies, and inject and extract electrons into and from the floating gates. For example, by setting both Gate and xGate to 20V and both Vbody(p) and Vbody(n) to 0V, it is possible to inject electrons into the floating gates from the bodies of the transistors RWTp and RWTn. By setting both Gate and xGate to 0V and both Vbody(p) and Vbody(n) to 20V, it is possible to extract electrons from the floating gates to the bodies of the transistors RWTp and RWTn.

Conditions for applying a high electric field to a tunnel oxide film between the floating gate and the body (polysilicon) are set such that electrons in the floating gate of each of the transistors RWTp and RWTn come out to the body (polysilicon) side by the tunnel effect, or that electrons in the body (polysilicon) are injected into the floating gate thereof by the tunnel effect. In other words, conditions are set such that the tunnel oxide film is thinner than the insulation film between the gate and the floating gate, and the dielectric constant of the tunnel oxide film is lower than that of the insulation film (because a high voltage is applied to the low capacitive side).

As illustrated in FIG. 5, it is possible to configure the MIP liquid crystal display device by coupling the body (polysilicon) to the data line Data or the inverted data line xData, and by coupling the gate to the gate line Gate or the inverted gate line xGate.

Overall Operation

Figure 11:
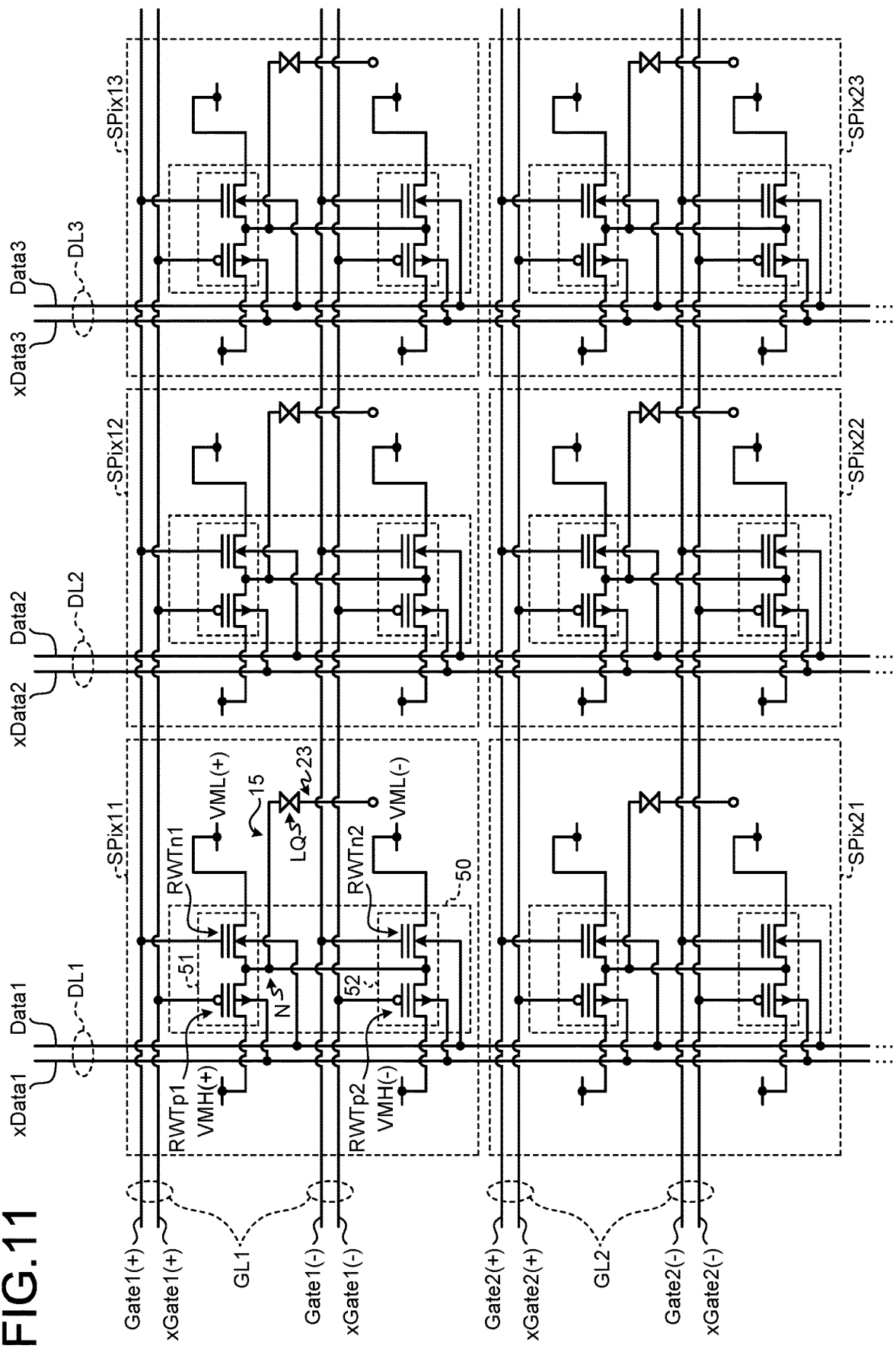
FIG. 11 is a diagram illustrating a configuration of sub-pixels in the display device of the first aspect of the first embodiment.

FIG. 11 is a diagram illustrating a configuration of sub-pixels in the display device of the first aspect of the first embodiment. FIG. 11 illustrates six sub-pixels SPix of 2 rows×3 columns among the sub-pixels SPix of M rows× (N×3) columns. In FIG. 11, the illustration of the common potential line FRP is omitted.

The principles of erasing and writing operations of a NAND type flash memory (for example, see Japanese Patent No. 2685770 (JP 2685770)) are used for erasing (sub-pixel data "0" is stored, extraction of electrons from the floating gate) and writing (sub-pixel data "1" is stored, injection of electrons into the floating gate) data.

The first memory 51 stores therein the sub-pixel data used for displaying an image during the plus field period, and the second memory 52 stores therein the sub-pixel data used for displaying an image during the minus field period.

During the plus field period, the gate line drive circuit 9 (see FIG. 4) supplies 0V to the gate lines Gate1(+) and Gate2(+) and supplies 3V to the inverted gate lines xGate1(+) and xGate2(+). Consequently, the first memory 51 in each sub-pixel SPix is selected. The gate line drive circuit 9 also supplies −3V to the gate lines Gate1(−) and Gate2(−) and supplies 6V to the inverted gate lines xGate1(−) and xGate2(−). Consequently, the second memory 52 in each sub-pixel SPix is not selected. Thus, during the plus field period, each sub-pixel SPix displays an image on the basis of the sub-pixel data stored in the first memory 51.

During the minus field period, the gate line drive circuit 9 supplies 0V to the gate lines Gate1(−) and Gate2(−) and supplies 3V to the inverted gate lines xGate1(−) and xGate2(−). Consequently, the second memory 52 in each sub-pixel SPix is selected. The gate line drive circuit 9 also supplies −3V to the gate lines Gate1(+) and Gate2(+) and supplies 6V to the inverted gate lines xGate1(+) and xGate2(+). Consequently, the first memory 51 in each sub-pixel SPix is not selected. Thus, during the minus field period, each sub-pixel SPix displays an image on the basis of the sub-pixel data stored in the second memory 52.

FIG. 12 is a table illustrating the potentials to be applied to each memory block when data is read out, in the display device of the first aspect of the first embodiment. More specifically, FIG. 12 is a table illustrating the potentials to be applied to the memory block 50 during the plus field period and the minus field period.

As described above, the display device 1 of the first aspect of the first embodiment adopts the common inversion driving method. That is, the common potential Vcom of the common electrode 23 is set to a low level (0V) during the plus field period and set to a high level (3V) during the minus field period. Thus, in order to maintain the same display state during both periods, the logic is inverted between the sub-pixel data stored in the first memory 51 and the sub-pixel data stored in the second memory 52.

For example, in displaying a black color, electrons are extracted from the floating gate of each of the transistors RWTp1 and RWTn1 in the first memory 51. On the other hand, electrons are injected into the floating gate of each of the transistors RWTp2 and RWTn2 in the second memory 52. During the plus field period, a black color is displayed on the basis of the charge state (electron extraction state) of the floating gate of the first memory 51. During the minus field period, a black color is displayed on the basis of the charge state (electron injection state) of the floating gate of the second memory 52. Consequently, a black color is displayed during both the plus field period and the minus field period.

For example, to display a white color, electrons are injected into the floating gates of the transistors RWTp1 and RWTn1 in the first memory 51. On the other hand, electrons are extracted from the floating gates of the transistors RWTp2 and RWTn2 in the second memory 52. During the plus field period, a white color is displayed on the basis of the state of electric charge (electron injection state) of the floating gates of the first memory 51. During the minus field period, a white color is displayed on the basis of the state of electric charge (electron extraction state) of the floating gates of the second memory 52. Consequently, a white color is displayed during both the plus field period and the minus field period.

Figure 14:
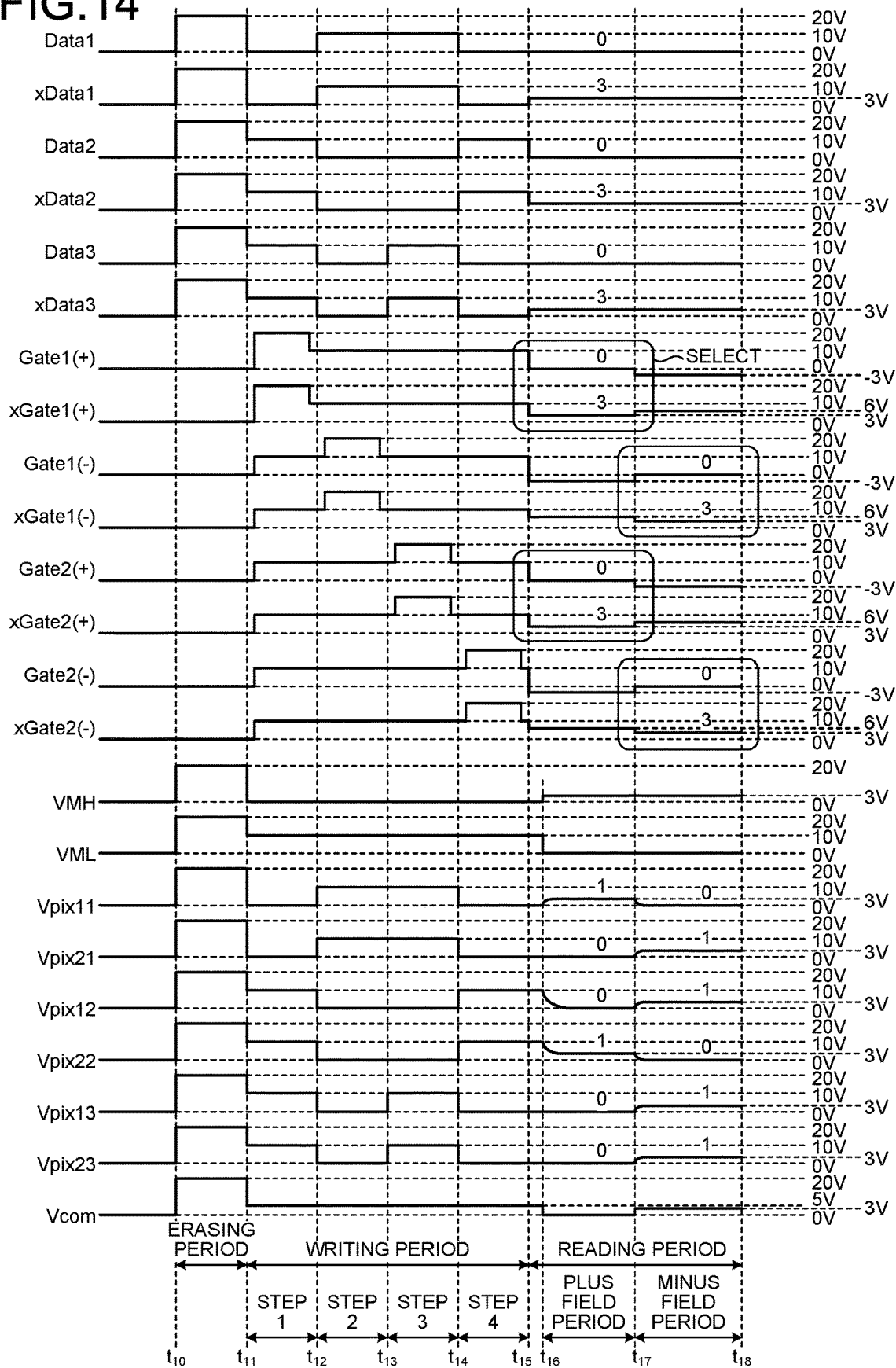
FIG. 14 is a timing chart illustrating operation timings in writing to and reading from the sub-pixel in the display device of the first aspect of the first embodiment.

FIG. 13 is a diagram illustrating an example of sub-pixel data to be written to the sub-pixel in the display device of the first aspect of the first embodiment. FIG. 14 is a timing chart illustrating operation timings in writing to and reading from a sub-pixel on the basis of FIG. 13. FIG. 15 is a diagram illustrating the potentials of the elements during the periods in FIG. 14.

An operation of writing sub-pixel data to the sub-pixel SPix in the display device 1 will now be described.

Data needs to be erased from the transistors RWTp1, RWTn1, RWTp2, and RWTn2, which are flash memories, before sub-pixel data is written thereto. In FIG. 14 and FIG. 15, the erasing period is from timing to $t_{10}$ timing $t_{11}$.

The writing period is from the timing $t_{11}$ to timing $t_{15}$ after the erasing period. The writing period includes a step 1 from the timing $t_{11}$ to the timing $t_{12}$, a step 2 from the timing $t_{12}$ to the timing $t_{13}$, a step 3 from the timing $t_{13}$ to the timing $t_{14}$, and a step 4 from the timing $t_{14}$ to the timing $t_{15}$.

The step 1 is a writing period for the first memories 51 of sub-pixels SPix11, SPix12, and SPix13 in the first row. The step 2 is a writing period for the second memories 52 of the sub-pixels SPix11, SPix12, and SPix13 in the first row. The step 3 is a writing period for the first memories 51 of sub-pixels SPix21, SPix22, and SPix23 in the second row. The step 4 is a writing period for the second memories 52 of the sub-pixels SPix21, SPix22, and SPix23 in the second row.

Referring to FIG. 14 and FIG. 15, at the timing $t_{10}$ of starting the erasing period, the power supply potentials VMH and VML are set to 20V in order to apply a high electric field (20V) to the transistors RWTp1, RWTn1, RWTp2, and RWTn2.

The common electrode drive circuit 6 (see FIG. 4) outputs the common potential Vcom of 20V to the common electrode 23. The reason is as follows. During the erasing period, the potential Vpix of the sub-pixel electrode 15 is set to 20V. The voltage between the sub-pixel electrode 15 and the common electrode 23 is applied to the liquid crystal molecules LQ. Thus, the common potential is supplied thereto in order not to apply a high voltage to the liquid crystal molecules LQ and hamper the liquid crystal molecules from being damaged. When the common potential Vcom of the common electrode 23 is set to 20V, the voltage to be applied to the liquid crystal molecules becomes 0V.

The data line drive circuit 5 (see FIG. 4) outputs a data signal of 20V to each of the data lines Data1, Data2, and Data3, and the inverted data lines xData1, xData2, and xData3.

The gate line drive circuit 9 (see FIG. 4) outputs a gate signal of 0V to the gate lines Gate1 (+), Gate1 (−), Gate2(+), and Gate2(−), and the inverted gate lines xGate1(+), xGate1 (−), xGate2(+), and xGate2(−).

Thus, a high electric field (20V) is applied between the gates and the bodies of the transistors RWTp1, RWTn1, RWTp2, RWTn2 of all the sub-pixels SPix. Consequently, by the tunnel effect, electrons are extracted from the floating gates to the bodies of the transistors RWTp1, RWTn1, RWTp2, and RWTn2 of all the sub-pixels SPix. That is, the first memories 51 and the second memories 52 of all the sub-pixels SPix each store therein the sub-pixel data "0".

Figure 16:
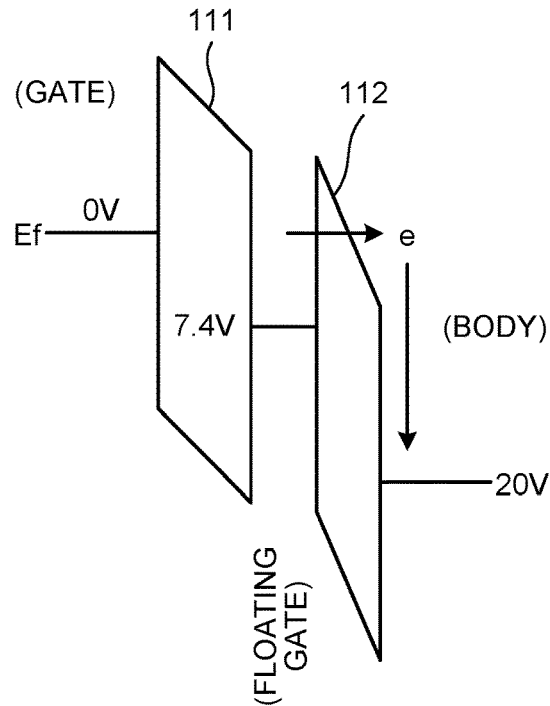
FIG. 16 is an energy band diagram of the memory in the sub-pixel in the display device of the first aspect of the first embodiment.

FIG. 16 is an energy band diagram of the memory in the sub-pixel in the display device of the first aspect of the first embodiment. More specifically, FIG. 16 is an energy band diagram of the memory in the sub-pixel SPix, when electrons are extracted from the floating gate of each of the transistors RWTn1 and RWTn2 to the body thereof.

In FIG. 16, assume that the thickness of a first gate insulation film 111, which is a thermal oxide film, is 350 angstroms (35 nanometers), and the dielectric constant thereof is 3ε (ε is dielectric constant of the thermal oxide film). Furthermore, assume that the thickness of a second gate insulation film (tunnel oxide film) 112, which is a thermal oxide film, is 200 angstroms (20 nanometers), and the dielectric constant thereof is ε. As these numerical values, the numerical values disclosed in JP 2685770 are used.

Conditions for applying a high electric field to the second gate insulation film 112 are set such that the electrons in the floating gate come out to the body side by the tunnel effect. In other words, conditions are balanced so that the second gate insulation film 112 is thinner than the first gate insulation film 111, and the dielectric constant of the second gate insulation film 112 is lower than the dielectric constant of the first gate insulation film 111 (because a high voltage is applied to the low capacitive side). When the potential difference between the gate and the body is 10V, the tunnel effect is not generated.

Using the numerical values described above, an electrostatic capacitance C2 of the first gate insulation film 111 is represented by the following expression (1).

$$C2 = 3\varepsilon/(350\,\text{angstroms}) \tag{1}$$

An electrostatic capacitance C1 of the second gate insulation film 112 is represented by the following expression (2).

$$C1 = \varepsilon/(200\,\text{angstroms}) \tag{2}$$

If ε=1, C2=8571428.571 (farads) and C1=5000000 (farads) are satisfied.

Thus, a voltage V2 of the first gate insulation film 111 is represented by the following expression (3).

$$V2 = 20 \times C1/(C1+C2) = 7.368421 \text{(volts)} \quad (3)$$

A voltage V1 of the second gate insulation film 112 is represented by the following expression (4).

$$V1 = 20 \times C2/(C1+C2) = 12.63158 \text{(volts)} \quad (4)$$

Figure 17:
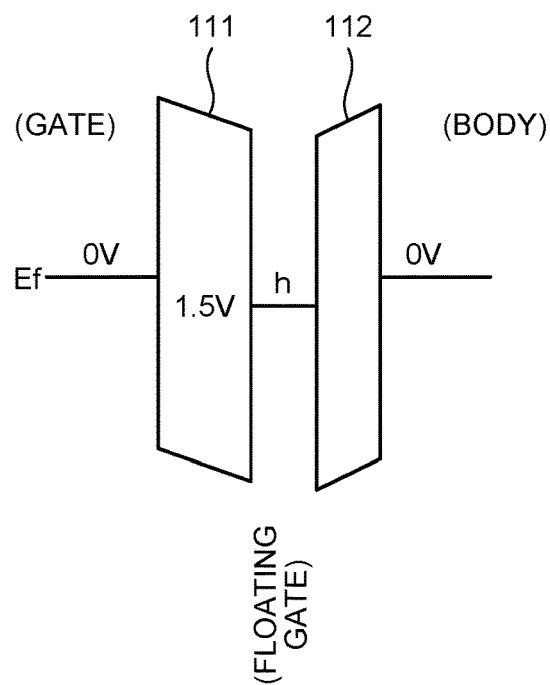
FIG. 17 is an energy band diagram of the memory in the sub-pixel in the display device of the first aspect of the first embodiment.

FIG. 17 is an energy band diagram of the memory in the sub-pixel in the display device of the first aspect of the first embodiment. More specifically, FIG. 17 is an energy band diagram of the memory in the sub-pixel SPix after the electrons are extracted from the floating gate to the body of each of the transistors RWTn1 and RWTn2. In this process, the threshold voltage Vth between the gate and the source is −1V (n channel). The threshold voltage Vth between the gate and the source after the electrons are extracted from the floating gate to the body of each of the transistors RWTp1 and RWTp2 is −2V (p channel).

Referring again to FIG. 14, the potential Vpix11 of the sub-pixel electrode 15 of the sub-pixel SPix11, the potential Vpix21 of the sub-pixel electrode 15 of the sub-pixel SPix21, and the potential Vpix12 of the sub-pixel electrode 15 of the sub-pixel SPix12 are 20V. Similarly, the potential Vpix22 of the sub-pixel electrode 15 of the sub-pixel SPix22, the potential Vpix13 of the sub-pixel electrode 15 of the sub-pixel SPix13, and the potential Vpix23 of the sub-pixel electrode 15 of the sub-pixel SPix23 are 20V. Next, at the timing $t_{11}$ of starting the step 1 in the writing period, the power supply potential VMH is set to 0V and the power supply potential VML is set to 10V. The reason is as follows. The body is coupled to the data line Data or the inverted data line xData, and 0V or 10V is applied thereto. Thus, the power supply potentials are set to those levels in order to hamper a forward bias from being applied to a pn connection of the P channel-type transistor and the N channel type transistor at the source electrode side, and prevent an excessive current from flowing therethrough.

The common potential Vcom of the common electrode 23 is set to 5V. The reason is as follows. During the writing period, the potential Vpix of the sub-pixel electrode 15 is changed to 0V or 10V. The voltage between the sub-pixel electrode 15 and the common electrode 23 is applied to the liquid crystal molecules LQ. Thus, the common potential is set to the above-mentioned level in order to prevent a high voltage from being applied to the liquid crystal molecules LQ. If the common potential Vcom of the common electrode 23 is 5V, the voltage applied to the liquid crystal molecules becomes 5V.

The data line drive circuit 5 outputs a data signal of 0V to the data line Data1 and the inverted data line xData1. The data line drive circuit 5 also outputs a data signal of 10V to the data lines Data2 and Data3, and the inverted data lines xData2 and xData3.

After waiting time has elapsed from the timing $t_{11}$, the gate line drive circuit 9 outputs a gate signal of 20V to the gate line Gate1 (+) and the inverted gate line xGate1(+). The gate line drive circuit 9 also outputs a gate signal of 10V to the gate lines Gate1 (−), Gate2(+), and Gate2(−), and the inverted gate lines xGate1 (−), xGate2(+), and xGate2(−).

Thus, a high electric field (20V) is applied between the gate and the body of each of the transistors RWTp1 and RWTn1 of the sub-pixel SPix11. Consequently, by the tunnel effect, electrons are injected into the floating gate of each of the transistors RWTp1 and RWTn1 of the sub-pixel SPix11 from the body thereof. That is, the first memory 51 of the sub-pixel SPix11 stores therein the sub-pixel data "1" (white).

Figure 18:
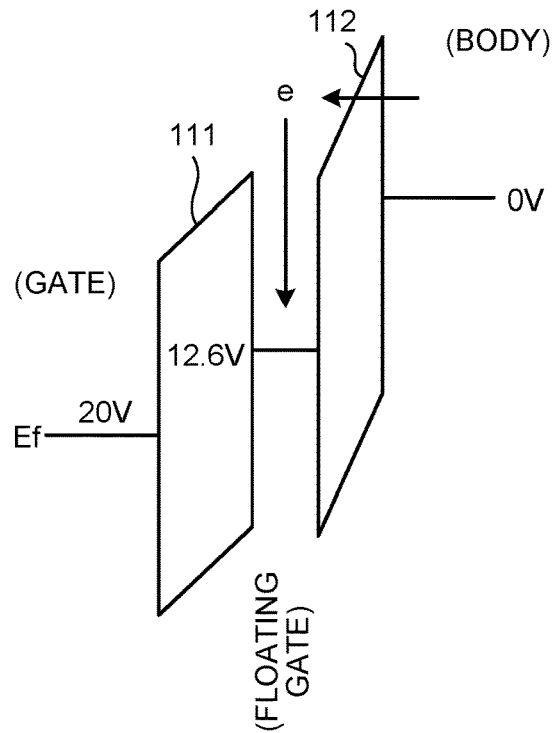
FIG. 18 is an energy band diagram of the memory in the sub-pixel in the display device of the first aspect of the first embodiment.

FIG. 18 is an energy band diagram of the memory in the sub-pixel in the display device of the first aspect of the first embodiment. More specifically, FIG. 18 is an energy band diagram of the memory in the sub-pixel SPix, when electrons are injected into the floating gates of the transistors RWTn1 and RWTn2 from the bodies thereof.

Figure 19:
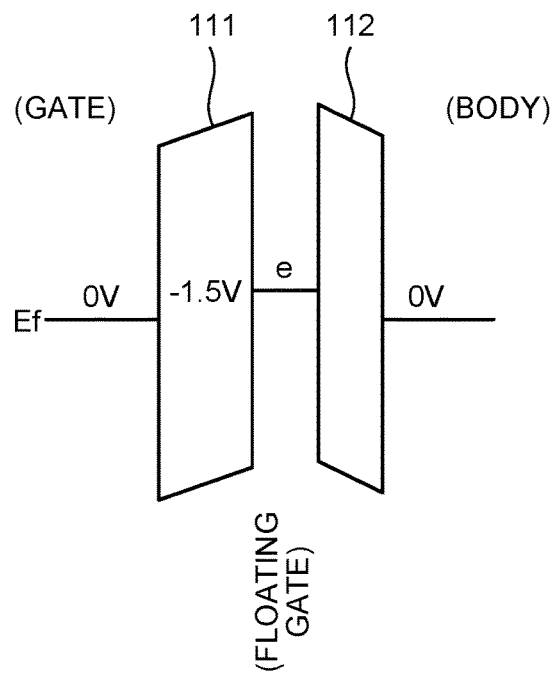
FIG. 19 is an energy band diagram of the memory in the sub-pixel in the display device of the first aspect of the first embodiment.

FIG. 19 is an energy band diagram of the memory in the sub-pixel in the display device of the first aspect of the first embodiment. More specifically, FIG. 19 is an energy band diagram of the memory in the sub-pixel SPix, after electrons are injected into the floating gate of each of the transistors RWTn1 and RWTn2 from the body thereof. In this process, the threshold voltage Vth between the gate and the source becomes 2V (n channel). The threshold voltage Vth between the gate and the source, after electrons are extracted from the floating gate to the body of each of the transistors RWTp1 and RWTp2, becomes 1V (p channel).

Referring again to FIG. 14, 10V is applied between the gate and the body of each of the transistors RWTp1 and RWTn1 of the sub-pixels SPix12 and SPix13, instead of a high electric field (20V). That is, the first memories 51 of the sub-pixels SPix12 and SPix13 maintain the sub-pixel data "0" (black).

FIG. 20A is a diagram illustrating a relation between data of the sub-pixel and the electric field of the liquid crystal layer 30 in the display device of the first aspect of the first embodiment. More specifically, FIG. 20A is a diagram illustrating a relation between the sub-pixel data stored in the first memory 51 and the electric field applied to the liquid crystal molecules, during the plus field period. In a state in which electrons are extracted from the floating gate of each of the transistors RWTp1 and RWTn1 of the first memory 51, in other words, in a state in which the sub-pixel data of the first memory 51 is erased, the first memory 51 stores therein the sub-pixel data "0". As described at the step 1, the writing operation is performed on the first memory 51, only when the sub-pixel data "1" is written to the first memory 51. Data is not written to the first memory 51 to maintain the sub-pixel data "0" in the first memory 51, and the first memory 51 maintains the erasure state (sub-pixel data "0"). In a state in which the sub-pixel data "1" is written to the first memory 51, an electric field is generated in the liquid crystal layer 30. In a state in which the sub-pixel data "0" is maintained in the first memory 51, no electric field is generated in the liquid crystal layer 30.

FIG. 20B is a diagram illustrating a relation between data of the sub-pixel and an electric field of the liquid crystal layer 30 in the display device of the first aspect of the first embodiment. More specifically, FIG. 20B is a diagram illustrating a relation between the sub-pixel data stored in the second memory 52 and the electric field applied to the liquid crystal molecules, during the minus field period. In a state in which electrons are extracted from the floating gate of each of the transistors RWTp2 and RWTn2 of the second memory 52, in other words, in a state in which the sub-pixel data of the second memory 52 is erased, the second memory 52 stores therein the sub-pixel data "0". Then, as described at the step 1, the writing operation is performed on the second memory 52, only when the sub-pixel data "1" is written to the second memory 52. Data is not written to the second memory 52 to maintain the sub-pixel data "0" in the second memory 52, and the second memory 52 maintains the erasure state (sub-pixel data "0"). In a state in which the sub-pixel data "1" is written to the second memory 52, no electric field is generated in the liquid crystal layer 30. In a state in which the sub-pixel data "0" is maintained in the second memory 52, an electric field is generated in the liquid crystal molecules.

Referring again to FIG. 14, next, at the timing $t_{12}$ of starting the step 2 in the writing period, the data line drive circuit 5 outputs a data signal of 10V to the data line Data1 and the inverted data line xData1. The data line drive circuit 5 also outputs a data signal of 0V to the data lines Data2 and Data3, and the inverted data lines xData2 and xData3.

After waiting time has elapsed from the timing $t_{12}$, the gate line drive circuit 9 outputs a gate signal of 10V to the gate lines Gate1 (+), Gate2(+), and Gate2(−), and the inverted gate lines xGate1(+), xGate2(+), and xGate2(−). The gate line drive circuit 9 also outputs a gate signal of 20V to the gate line Gate1 (−) and the inverted gate line xGate1 (−).

Thus, a high electric field (20V) is applied between the gate and the body of each of the transistors RWTp2 and RWTn2 of the sub-pixels SPix12 and SPix13. Consequently, by the tunnel effect, electrons are injected into the floating gate of each of the transistors RWTp2 and RWTn2 of the sub-pixels SPix12 and SPix13 from the body thereof. That is, the second memories 52 of the sub-pixels SPix12 and SPix13 store therein the sub-pixel data "1" (black (inverted)).

On the other hand, 10V is applied between the gate and the body of each of the transistors RWTp2 and RWTn2 of the sub-pixel SPix11, instead of a high electric field (20V). That is, the second memory 52 of the sub-pixel SPix11 maintains the sub-pixel data "0" (white (inverted)).

At the step 1 and the step 2, the first memory 51 of the sub-pixel SPix11 stores therein the sub-pixel data "1" (white), and the second memory 52 stores therein the sub-pixel data "0" (white (inverted)) obtained by logically inverting the data "1" (white) of the first memory 51. The first memory 51 of the sub-pixel SPix12 stores therein the sub-pixel data "0" (black), and the second memory 52 stores therein the sub-pixel data "1" (black (inverted)) obtained by logically inverting the sub-pixel data "0" (black) of the first memory 51. The first memory 51 of the sub-pixel SPix13 also stores therein the sub-pixel data "0" (black), and the second memory 52 stores therein the sub-pixel data "1" (black (inverted)) obtained by logically inverting the sub-pixel data "0" (black) of the first memory 51.

Next, at the timing $t_{13}$ of starting the step 3 in the writing period, the data line drive circuit 5 outputs a data signal of 10V to the data lines Data1 and Data3, and the inverted data lines xData1 and xData3. The data line drive circuit 5 also outputs a data signal of 0V to the data line Data2 and the inverted data line xData2.

After waiting time has elapsed from the timing $t_{13}$, the gate line drive circuit 9 outputs a gate signal of 10V to the gate lines Gate1(+), Gate1 (−), and Gate2(−), and the inverted gate lines xGate1(+), xGate1 (−), and xGate2(−). The gate line drive circuit 9 also outputs a gate signal of 20V to the gate line Gate2(+) and the inverted gate line xGate2 (+).

Thus, a high electric field (20V) is applied between the gate and the body of each of the transistors RWTp1 and RWTn1 of the sub-pixel SPix22. Consequently, by the tunnel effect, electrons are injected into the floating gate of each of the transistors RWTp1 and RWTn1 of the sub-pixel SPix22. That is, the first memory 51 of the sub-pixel SPix22 stores therein the sub-pixel data "1" (white).

On the other hand, 10V is applied between the gate and the body of each of the transistors RWTp1 and RWTn1 of the sub-pixels SPix21 and SPix23, instead of a high electric field (20V). That is, the first memories 51 of the sub-pixels SPix21 and SPix23 maintain the sub-pixel data "0" (black).

Next, at the timing $t_{14}$ of starting the step 4 in the writing period, the data line drive circuit 5 outputs a data signal of 0V to the data lines Data1 and Data3, and the inverted data lines xData1 and xData3. The data line drive circuit 5 also outputs a data signal of 10V to the data line Data2 and the inverted Data line xData2.

After waiting time has elapsed from the timing $t_{14}$, the gate line drive circuit 9 outputs a gate signal of 10V to the gate lines Gate1(+), Gate1 (−), and Gate2(+), and the inverted gate lines xGate1(+), xGate1 (−), and xGate2(+). The gate line drive circuit 9 also outputs a gate signal of 20V to the gate line Gate2(−) and the inverted gate line xGate2 (−).

Thus, a high electric field (20V) is applied between the gate and the body of each of the transistors RWTp2 and RWTn2 of the sub-pixels SPix21 and SPix23. Consequently, by the tunnel effect, electrons are injected into the floating gate of each of the transistors RWTp2 and RWTn2 of the sub-pixels SPix21 and SPix23. That is, the second memories 52 of the sub-pixels SPix21 and SPix23 store therein the sub-pixel data "1" (black (inverted)).

On the other hand, 10V is applied between the gate and the body of each of the transistors RWTp2 and RWTn2 of the sub-pixel SPix22, instead of a high electric field (20V). That is, the second memories 52 of the sub-pixels SPix21 and SPix23 maintain the sub-pixel data "0" (white (inverted)).

At the step 3 and the step 4, the first memory 51 of the sub-pixel SPix21 stores therein the sub-pixel data "0" (black), and the second memory 52 stores therein the data "1" (black (inverted)) obtained by logically inverting the sub-pixel data "0" (black) of the first memory 51. The first memory 51 of the sub-pixel SPix22 stores therein the sub-pixel data "1" (white), and the second memory 52 stores therein the data "0" (white (inverted)) obtained by logically inverting the sub-pixel data "1" (white) of the first memory 51. The first memory 51 of the sub-pixel SPix23 stores therein the sub-pixel data "0" (black), and the second memory 52 stores therein the sub-pixel data "1" (black (inverted)) obtained by logically inverting the sub-pixel data "0" (black) of the first memory 51.

In this example, data is written to the first memory 51 at the odd numbered steps, and data is written to the second memory 52 at the even numbered steps. However, this may be reversed. That is, data may be written to the second memory 52 at the odd numbered steps, and data may be written to the first memory 51 at the even numbered steps.

FIG. 21 is a diagram illustrating the potentials of the elements in reading from the sub-pixel in the display device of the first aspect of the first embodiment.

An operation of reading out sub-pixel data from the sub-pixel SPix in the display device 1 will now be described.

The reading period is from timing $t_{15}$ to timing $t_{18}$. The reading period includes the plus field period from the timing $t_{16}$ to the timing $t_{17}$, and the minus field period from the timing $t_{17}$ to the timing $t_{18}$.

Referring to FIG. 14, at the timing $t_{15}$ of starting the reading period, the power supply potential VMH is 0V, and the power supply potential VML is 10V.

The data line drive circuit 5 (see FIG. 4) outputs a data signal of 0V to the data lines Data1, Data2, and Data3. The data line drive circuit 5 also outputs a data signal of 3V to the inverted data lines xData1, xData2, and xData3. Consequently, a bias is applied to the body of each transistor.

The gate line drive circuit 9 (see FIG. 4) outputs a gate signal of 0V to the gate lines Gate1 (+) and Gate2(+). The gate line drive circuit 9 also outputs a gate signal of 3V to the inverted gate lines xGate1(+) and xGate2(+). Consequently, the first memory 51 in each sub-pixel SPix is selected.

The gate line drive circuit 9 outputs a gate signal of −3V to the gate lines Gate1(−) and Gate2(−). The gate line drive circuit 9 also outputs a gate signal of 6V to the inverted gate lines xGate1(−) and xGate2(−). Consequently, the second memory 52 of each sub-pixel SPix is not selected.

Next, at the timing $t_{16}$ after waiting time has elapsed from the timing $t_{15}$, the power supply potential VMH is set to 3V, and the power supply potential VML is set to 0V. The common electrode drive circuit 6 (see FIG. 4) outputs the common potential Vcom of 0V to the common electrode 23.

Consequently, the first memory 51 of the sub-pixel SPix11 stores therein the sub-pixel data "1" (white), and therefore the potential Vpix11 of the sub-pixel electrode 15 of the sub-pixel SPix11 becomes 3V. Thus, in the sub-pixel SPix11, the voltage applied to the liquid crystal molecules LQ is 3V. Consequently, the sub-pixel SPix11 displays a white color.

The first memory 51 of the sub-pixel SPix21 stores therein the sub-pixel data "0" (black), and therefore the potential Vpix21 of the sub-pixel electrode 15 of the sub-pixel SPix21 becomes 0V. Thus, in the sub-pixel SPix21, the voltage applied to the liquid crystal molecules LQ is 0V. Consequently, the sub-pixel SPix21 displays a black color.

The first memory 51 of the sub-pixel SPix12 stores therein the sub-pixel data "0" (black), and therefore the potential Vpix12 of the sub-pixel electrode 15 of the sub-pixel SPix12 becomes 0V. Thus, in the sub-pixel SPix12, the voltage applied to the liquid crystal molecules LQ is 0V. Consequently, the sub-pixel SPix12 displays a black color.

The first memory 51 of the sub-pixel SPix22 stores therein the sub-pixel data "1" (white), and therefore the potential Vpix22 of the sub-pixel electrode 15 of the sub-pixel SPix22 becomes 3V. Thus, in the sub-pixel SPix22, the voltage applied to the liquid crystal molecules LQ is 3V. Consequently, the sub-pixel SPix22 displays a white color.

The first memory 51 of the sub-pixel SPix13 stores therein the sub-pixel data "0" (black), and therefore the potential Vpix13 of the sub-pixel electrode 15 of the sub-pixel SPix13 becomes 0V. Thus, in the sub-pixel SPix13, the voltage applied to the liquid crystal molecules LQ is 0V. Consequently, the sub-pixel SPix13 displays a black color.

The first memory 51 of the sub-pixel SPix23 stores therein the sub-pixel data "0" (black), and therefore the potential Vpix23 of the sub-pixel electrode 15 of the sub-pixel SPix23 becomes 0V. Thus, in the sub-pixel SPix23, the voltage applied to the liquid crystal molecules LQ is 0V. Consequently, the sub-pixel SPix23 displays a black color.

Next, at the timing $t_{17}$, the common electrode drive circuit 6 outputs the common potential Vcom of 3V to the common electrode 23.

The gate line drive circuit 9 outputs a gate signal of −3V to the gate lines Gate1(+) and Gate2(+). The gate line drive circuit 9 also outputs a gate signal of 6V to the inverted gate lines xGate1(+) and xGate2(+). Consequently, the first memory 51 in each sub-pixel SPix is not selected.

The gate line drive circuit 9 outputs a gate signal of 0V to the gate lines Gate1(−) and Gate2(−). The gate line drive circuit 9 also outputs a gate signal of 3V to the inverted gate lines xGate1(−) and xGate2(−). Consequently, the second memory 52 in each sub-pixel SPix is selected.

Consequently, the second memory 52 of the sub-pixel SPix11 stores therein the sub-pixel data "0" (white (inverted)), and therefore the potential Vpix11 of the sub-pixel electrode 15 of the sub-pixel SPix11 becomes 0V. Thus, in the sub-pixel SPix11, the voltage applied to the liquid crystal molecules LQ is 3V. Consequently, the sub-pixel SPix11 displays a white color.

The second memory 52 of the sub-pixel SPix21 stores therein the sub-pixel data "1" (black (inverted)), and therefore the potential Vpix21 of the sub-pixel electrode 15 of the sub-pixel SPix21 becomes 3V. Thus, in the sub-pixel SPix21, the voltage applied to the liquid crystal molecules LQ is 0V. Consequently, the sub-pixel SPix21 displays a black color.

The second memory 52 of the sub-pixel SPix12 stores therein the sub-pixel data "1" (black (inverted)), and therefore the potential Vpix12 of the sub-pixel electrode 15 of the sub-pixel SPix12 becomes 3V. Thus, in the sub-pixel SPix12, the voltage applied to the liquid crystal molecules LQ is 0V. Consequently, the sub-pixel SPix12 displays a black color.

The second memory 52 of the sub-pixel SPix22 stores therein the sub-pixel data "0" (white (inverted)), and therefore the potential Vpix22 of the sub-pixel electrode 15 of the sub-pixel SPix22 becomes 0V. Thus, in the sub-pixel SPix22, the voltage applied to the liquid crystal molecules LQ is 3V. Consequently, the sub-pixel SPix22 displays a white color.

The first memory 51 of the sub-pixel SPix13 stores therein the sub-pixel data "1" (black (inverted)), and therefore the potential Vpix13 of the sub-pixel electrode 15 of the sub-pixel SPix13 becomes 3V. Thus, in the sub-pixel SPix13, the voltage applied to the liquid crystal molecules LQ is 0V. Consequently, the sub-pixel SPix13 displays a black color.

The first memory 51 of the sub-pixel SPix23 stores therein the sub-pixel data "1" (black (inverted)), and therefore the potential Vpix23 of the sub-pixel electrode 15 of the sub-pixel SPix23 becomes 3V. Thus, in the sub-pixel SPix23, the voltage applied to the liquid crystal molecules LQ is 0V. Consequently, the sub-pixel SPix23 displays a black color.

FIG. 22 is a diagram illustrating the number of transistors in the sub-pixel in the display device of the first embodiment, and the number of transistors in the display element disclosed in Japanese Patent Application Laid-open Publication No. S58-196582 (JP-A-S58-196582).

In the display element disclosed in JP-A-S58-196582, the common inversion driving method is implemented using an inverting switch (transfer gates 20 and 21). The transfer gates 20 and 21 in JP-A-S58-196582 are formed by four transistors. On the other hand, in the display device 1 of the first embodiment of the present application, the common inversion driving method is implemented by alternately reading the sub-pixel data stored in the first memory 51 and the sub-pixel data stored in the second memory 52. Thus, the display device 1 of the first embodiment of the present application does not require the inverting switch.

As for the memory, in the display device 1 of the first embodiment of the present application, the number of transistors in the first memory 51 and the second memory 52 is four. On the other hand, in the display element disclosed in JP-A-S58-196582, the number of transistors in the memory is six (transistors 5 and 6, and inverters 14 and 15).

Hence, the total number of transistors in the display device 1 of the first embodiment of the present application is four. On the other hand, the total number of transistors in the display element in JP-A-S58-196582 is ten.

In this manner, the display device 1 of the first embodiment of the present application can significantly reduce the number of transistors compared to that of the display element in JP-A-S58-196582. Consequently, the display device 1 of the first embodiment of the present application can reduce the circuit scale and achieve high definition.

Due to the low transistor density, the display device 1 can reduce the risk of short circuit that would be caused by a foreign substance and the like, and improve the yield.

In the conventional MIP-type display device using SRAM, power supply needs to be maintained to keep the sub-pixel data. On the other hand, the display device 1 can keep the sub-pixel data even if power supply is cut off. Consequently, the display device 1 can reduce the power consumption.

Second Aspect of First Embodiment

FIG. 23 is a diagram illustrating a circuit configuration of a display device of a second aspect of the first embodiment. FIG. 23 illustrates the 2×2 sub-pixels SPix in the sub-pixels SPix of M rows×(N×3) columns.

Compared to the display device 1 of the first aspect of the first embodiment, a display device 1A of the second aspect of the first embodiment includes a common electrode drive circuit 6A instead of the common electrode drive circuit 6.

Upon receiving the supply of a power supply potential VDD, the common electrode drive circuit 6A outputs a constant common potential Vcom (for example, a fixed potential of 3V) common to the sub-pixels SPix to the common electrode 23 (see FIG. 2), via the common potential lines FRP1 and FRP2.

The other circuit configuration of the display device 1A is the same as that of the display device 1 of the first aspect of the first embodiment, and therefore the illustration and description thereof will be omitted.

The writing operation of the sub-pixel data to the sub-pixel SPix of the display device 1A is the same as that of the display device 1 of the first aspect of the first embodiment, and therefore the illustration and description thereof will be omitted.

FIG. 24 is a table illustrating the potentials to be applied to a memory block in the display device of the second aspect of the first embodiment. More specifically, FIG. 24 is a table illustrating the potentials to be applied to the memory block 50 during the plus field period and the minus field period.

As described above, the display device 1A of the second aspect of the first embodiment adopts the common constant driving method. That is, the common potential Vcom of the common electrode is constant (for example, 3V) during both periods of the plus field period and the minus field period.

As illustrated in FIG. 1B, to display a black color, the potential Vpix of the sub-pixel electrode 15 needs to be higher than the common potential Vcom (for example, 6V) during the plus field period, and the potential Vpix of the sub-pixel electrode 15 needs to be lower than the common potential Vcom (for example, 0V) during the minus field period.

Thus, as illustrated in FIG. 24, in the display device 1A, the power supply potential VMH(+) is set to 6V, the power supply potential VML(+) is set to 3V, the power supply potential VMH(−) is set to 3V, and the power supply potential VML(−) is set to 0V.

For example, to display a black color, electrons are extracted from the floating gates of the transistors RWTp1 and RWTn1 in the first memory 51 (sub-pixel data "0" is stored). On the other hand, electrons are injected into the floating gates of the transistors RWTp2 and RWTn2 in the second memory 52 (sub-pixel data "1" is stored).

During the plus field period, the gate line drive circuit 9 (see FIG. 23) outputs 6V to the inverted gate line xGate(+) and outputs 3V to the gate line Gate(+). Consequently, the first memory 51 in each sub-pixel SPix is selected. The gate line drive circuit 9 also outputs 9V to the inverted gate line xGate(−) and outputs 0V to the gate line Gate(−). Consequently, the second memory 52 in each sub-pixel SPix is not selected.

In this process, the transistor RWTn1 in each first memory 51 is made to be in an ON state, and therefore the potential Vpix of the sub-pixel electrode 15 in each sub-pixel SPix becomes 3V (=VML(+)). Thus, in each sub-pixel SPix, the voltage applied to the liquid crystal molecules LQ is 0V. Consequently, each sub-pixel SPix displays a black color.

During the minus field period, the gate line drive circuit 9 outputs 6V to the inverted gate line xGate(+) and outputs −3V to the gate line Gate(+). Consequently, the first memory 51 in each sub-pixel SPix is not selected. The gate line drive circuit 9 also outputs 3V to the inverted gate line xGate(−) and outputs 0V to the gate line Gate(−). Consequently, the second memory 52 in each sub-pixel SPix is selected.

In this process, the transistor RWTp2 in each second memory 52 is made to be in an ON state, and therefore the potential Vpix of the sub-pixel electrode 15 in each sub-pixel SPix becomes 3V (=VMH(−)). Thus, in each sub-pixel SPix, the voltage applied to the liquid crystal molecules LQ is 0V. Consequently, each sub-pixel SPix displays a black color.

For example, to display a white color, electrons are injected into the floating gates of the transistors RWTp1 and RWTn1 in the first memory 51 (sub-pixel data "1" is stored). On the other hand, electrons are extracted from the floating gates of the transistors RWTp2 and RWTn2 in the second memory 52 (sub-pixel data "0" is stored).

During the plus field period, the gate line drive circuit 9 (see FIG. 23) outputs 6V to the inverted gate line xGate(+) and outputs 3V to the gate line Gate(+). Consequently, the first memory 51 in each sub-pixel SPix is selected. The gate line drive circuit 9 also outputs 9V to the inverted gate line xGate(−) and outputs 0V to the gate line Gate(−). Consequently, the second memory 52 in each sub-pixel SPix is not selected.

In this process, the transistor RWTp1 in each first memory 51 is made to be in an ON state, and therefore the potential Vpix of the sub-pixel electrode 15 in each sub-pixel SPix becomes 6V (=VMH(+)). Thus, in each sub-pixel SPix, the voltage applied to the liquid crystal molecules LQ is 3V. Consequently, each sub-pixel SPix displays a white color.

During the minus field period, the gate line drive circuit 9 outputs 6V to the inverted gate line xGate(+) and outputs −3V to the gate line Gate(+). Consequently, the first memory 51 in each sub-pixel SPix is not selected. The gate line drive circuit 9 also outputs 3V to the inverted gate line xGate(−) and outputs 0V to the gate line Gate(−). Consequently, the second memory 52 in each sub-pixel SPix is selected.

In this process, the transistor RWTn2 in the second memory 52 is made to be in an ON state, and therefore the potential Vpix of the sub-pixel electrode 15 in each sub-pixel SPix becomes 0V (=VML(−)). Thus, in each sub-pixel SPix, the voltage applied to the liquid crystal molecules LQ is 3V. Consequently, each sub-pixel SPix displays a white color.

The display device 1A of the second aspect of the first embodiment exhibits the same advantageous effects as those of the display device 1 of the first aspect of the first embodiment.

Compared to the display device 1, the display device 1A can implement the common constant driving method by just changing the potential of each element, without changing the circuit configuration of the sub-pixel SPix.

Second Embodiment

Configuration

In the first embodiment, each sub-pixel SPix includes one memory block 50. In a second embodiment, each sub-pixel SPix includes a plurality of memory blocks.

In the second embodiment, the illustration and description of the configuration and operation the same as those of the first embodiment are omitted as appropriate.

Figure 25:
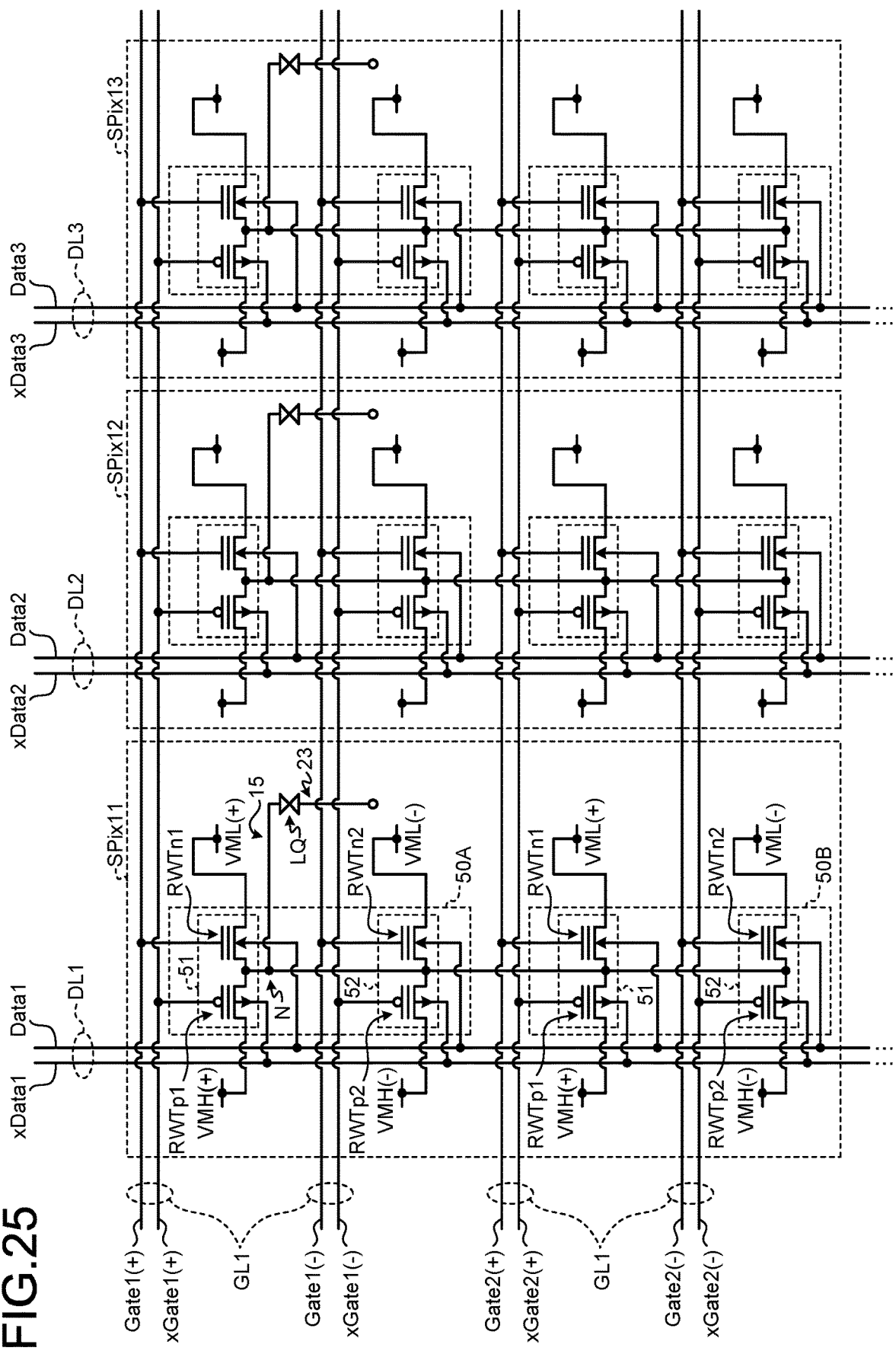
FIG. 25 is a diagram illustrating a configuration of a sub-pixel in a display device of a second embodiment.

FIG. 25 is a diagram illustrating a configuration of a sub-pixel in a display device of the second embodiment. FIG. 25 illustrates three sub-pixels SPix of 1 row×3 columns in the sub-pixels SPix of M rows×(N×3) columns. In FIG. 25, the illustration of the common potential line FRP is omitted.

Each sub-pixel SPix includes a first memory block 50A and a second memory block 50B. Each of the first memory block 50A and the second memory block 50B has the same circuit configuration as that of the memory block 50.

In the second embodiment, each sub-pixel SPix includes the first memory block 50A and the second memory block 50B. However, the present disclosure is not limited thereto. Each sub-pixel SPix may include three or more memory blocks.

Each sub-pixel SPix displays an image on the basis of the sub-pixel data stored in the memory block selected between the first memory block 50A and the second memory block 50B included in the sub-pixel SPix. The first memory 51 in the first memory block 50A and the first memory 51 in the second memory block 50B are used for displaying an image during the plus field period. The second memory 52 in the first memory block 50A and the second memory 52 in the second memory block 50B are used for displaying an image during the minus field period.

That is, a set of M×N×3×2 memory blocks included in the M×N×3 sub-pixels SPix is equivalent to two frame memories.

The coupling configuration of the first memory block 50A of each sub-pixel SPix is the same as that of the memory block 50 in the first embodiment, and therefore the description thereof will be omitted.

The gate of the transistor RWTp1 of the second memory block 50B of each sub-pixel SPix is coupled to the inverted gate line xGate2(+). The source of the transistor RWTp1 is coupled to the power supply potential VMH(+). The body of the transistor RWTp1 is coupled to the inverted data line xData1.

The gate of the transistor RWTn1 of the second memory block 50B of each sub-pixel SPix is coupled to the gate line Gate2(+). The source of the transistor RWTn1 is coupled to the power supply potential VML(+). The drain of the transistor RWTn1 is coupled to the drain of the transistor RWTp1. The body of the transistor RWTn1 is coupled to the data line Data1.

That is, the source-drain paths of the transistor RWTp1 and the transistor RWTn1 of the second memory block 50B of each sub-pixel SPix are coupled in series.

The coupling point of the transistor RWTp1 and the transistor RWTn1 of the second memory block 50B of each sub-pixel SPix is coupled to the node N.

The gate of the transistor RWTp2 of the second memory block 50B of each sub-pixel SPix is coupled to the inverted gate line xGate2(−). The source of the transistor RWTp2 is coupled to the power supply potential VMH(−). The body of the transistor RWTp2 is coupled to the inverted data line xData1.

The gate of the transistor RWTn2 of the second memory block 50B of each sub-pixel SPix is coupled to the gate line Gate2(−). The source of the transistor RWTn2 is coupled to the power supply potential VML(−). The drain of the transistor RWTn2 is coupled to the drain of the transistor RWTp2. The body of the transistor RWTn2 is coupled to the data line Data1.

That is, the source-drain paths of the transistor RWTp2 and the transistor RWTn2 of the second memory block 50B of each sub-pixel SPix are coupled in series.

The coupling point of the transistor RWTp2 and the transistor RWTn2 of the second memory block 50B of each sub-pixel SPix is coupled to the node N.

In the second embodiment, the gate lines Gate1(+), Gate1(−), Gate2(+), and Gate2(−), and the inverted gate lines xGate1(+), xGate1(−), xGate2(+), and xGate2(−) form the first gate line group GL1.

In the second embodiment, the common inversion driving method in the first embodiment is adopted. However, the present disclosure is not limited thereto. Similar to the first embodiment, in the second embodiment, the common constant driving method may be implemented by just changing the potential of each element, without changing the circuit configuration of the sub-pixel SPix.

Operation

Figure 27:
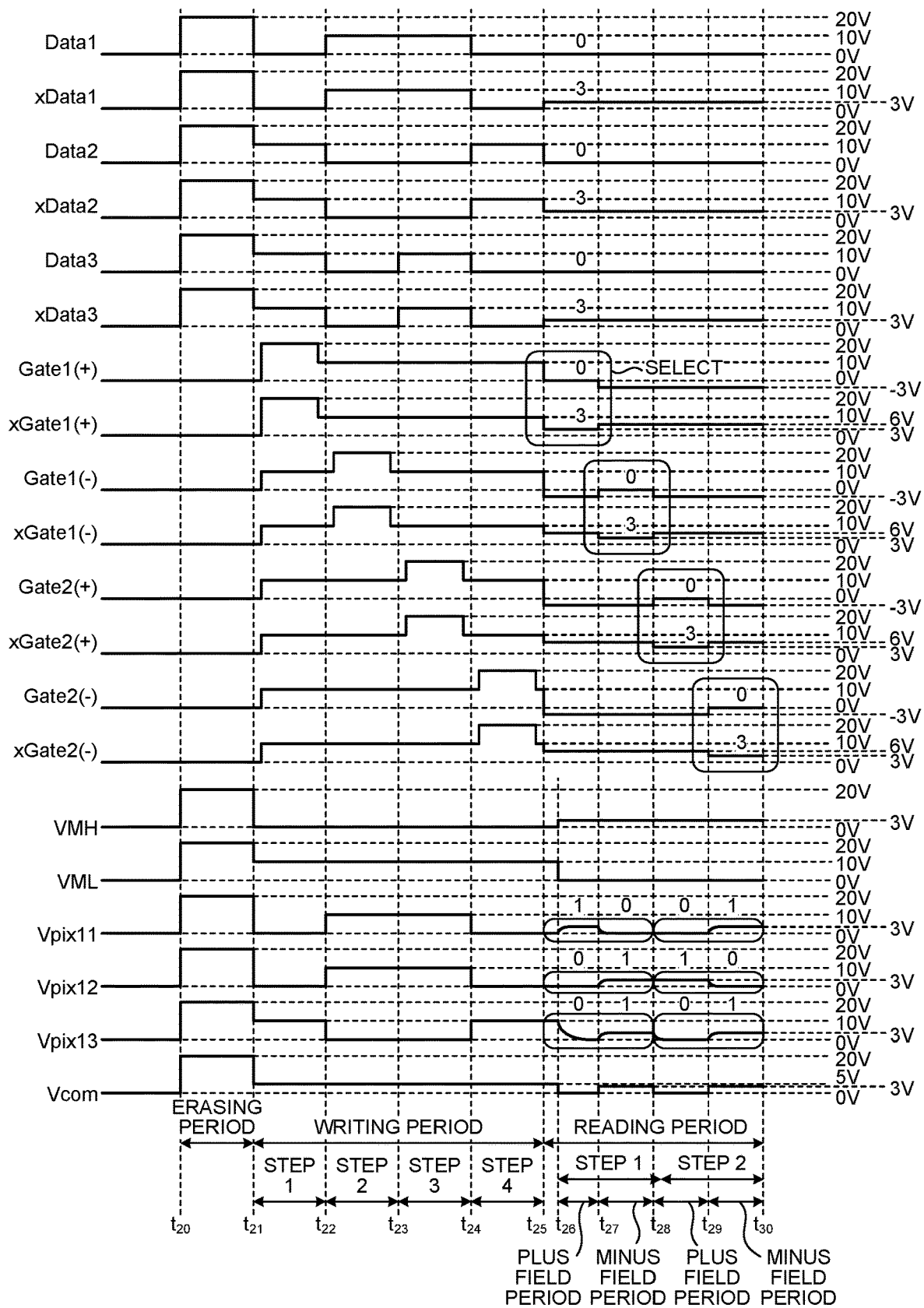
FIG. 27 is a timing chart illustrating operation timings in writing to and reading from the sub-pixel in the display device of the first aspect of the second embodiment.

FIG. 26 is a diagram illustrating sub-pixel data to be written to the sub-pixel in the display device of the second embodiment. FIG. 27 is a timing chart illustrating operation timings in writing to and reading from the sub-pixel in the display device of the first aspect of the second embodiment.

The potential of each element in writing data to the sub-pixel in the display device of the second embodiment is the same as that in FIG. 15 of the first embodiment.

An operation of writing sub-pixel data to the sub-pixel SPix of the display device 1 will now be described.

Data needs to be erased from the transistors RWTp1, RWTn1, RWTp2, and RWTn2, which are flash memories, before sub-pixel data is written thereto. In FIG. 27, the erasing period is from timing $t_{20}$ to timing $t_{21}$.

The writing period is from timing $t_{21}$ to timing $t_{25}$ after the erasing period. The writing period includes a step 1 from the timing $t_{21}$ to the timing $t_{22}$, a step 2 from the timing $t_{22}$ to the timing $t_{23}$, a step 3 from the timing $t_{23}$ to the timing $t_{24}$, and a step 4 from the timing $t_{24}$ to the timing $t_{25}$.

The step 1 is a writing period for the first memory 51 in the first memory block 50A of each of the sub-pixels SPix11, SPix12, and SPix13 in the first row. The step 2 is a writing period for the second memory 52 in the first memory block 50A of each of the sub-pixels SPix11, SPix12, and SPix13 in the first row. The step 3 is a writing period for the first memory 51 in the second memory block 50B of each of the sub-pixels SPix11, SPix12, and SPix13 in the first row. The step 4 is a writing period for the second memory 52 in the second memory block 50B of each of the sub-pixels SPix11, SPix12, and SPix13 in the first row.

An operation of the display device of the second embodiment from the timing $t_{20}$ to the timing $t_{25}$ is the same as that of the display device of the first embodiment from the timing $t_{10}$ to the timing $t_{15}$, and therefore the description thereof will be omitted.

From the step 1 to the step 4, the first memory 51 in the first memory block 50A of the sub-pixel SPix11 stores therein the sub-pixel data "1" (white), and the second memory 52 stores therein the sub-pixel data "0" (white (inverted)) obtained by logically inverting the data "1" (white) of the first memory 51. The first memory 51 in the second memory block 50B of the sub-pixel SPix11 stores therein the sub-pixel data "0" (black), and the second memory 52 stores therein the sub-pixel data "1" (black (inverted)) obtained by logically inverting the data "0" (black) of the first memory 51.

The first memory 51 in the first memory block 50A of the sub-pixel SPix12 stores therein the sub-pixel data "0" (black), and the second memory 52 stores therein the sub-pixel data "1" (black (inverted)) obtained by logically inverting the data "0" (black) of the first memory 51. The first memory 51 in the second memory block 50B of the sub-pixel SPix12 stores therein the sub-pixel data "1" (white), and the second memory 52 stores therein the sub-pixel data "0" (white (inverted)) obtained by logically inverting the data "1" (white) of the first memory 51.

The first memory 51 in the first memory block 50A of the sub-pixel SPix13 stores therein the sub-pixel data "0" (black), and the second memory 52 stores therein the sub-pixel data "1" (black (inverted)) obtained by logically inverting the data "0" (black) of the first memory 51. The first memory 51 in the second memory block 50B of the sub-pixel SPix13 stores therein the sub-pixel data "0", and the second memory 52 stores therein the sub-pixel data "1" (black (inverted)) obtained by logically inverting the data "0" (black) of the first memory 51.

In this example, data is written to the first memory 51 at the odd numbered steps, and data is written to the second memory 52 at the even numbered steps. However, this may be reversed. That is, data may be written to the second memory 52 at the odd numbered steps, and data may be written to the first memory 51 at the even numbered steps.

Figure 28:
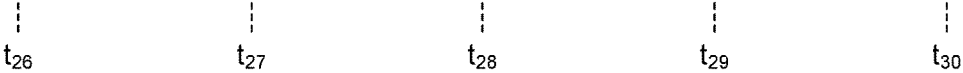
FIG. 28 is a diagram illustrating the potentials of the elements in reading from the sub-pixel in the display device of the second embodiment.

FIG. 28 is a diagram illustrating the potentials of the elements in reading from the sub-pixel in the display device of the second embodiment.

An operation of reading out sub-pixel data from the sub-pixel SPix in the display device of the second embodiment will now be described.

The reading period is from timing $t_{25}$ to timing $t_{30}$. The reading period includes a step 1 from the timing $t_{26}$ to the timing $t_{28}$, and a step 2 from the timing $t_{28}$ to the timing $t_{30}$. The step 1 includes the plus field period from the timing $t_{26}$ to the timing $t_{27}$, and the minus field period from the timing $t_{27}$ to the timing $t_{28}$. The step 2 includes the plus field period from the timing $t_{28}$ to the timing $t_{29}$, and the minus field period from the timing $t_{29}$ to the timing $t_{30}$.

The step 1 corresponds to the first frame period in the present disclosure, and the step 2 corresponds to the second frame period in the present disclosure.

Referring to FIG. 27, at the timing $t_{25}$ of starting the reading period, the power supply potential VMH is 0V, and the power supply potential VML is 10V.

The data line drive circuit 5 (see FIG. 4) outputs a data signal of 0V to the data lines Data1, Data2, and Data3. The data line drive circuit 5 also outputs a data signal of 3V to the inverted data lines xData1, xData2, and xData3. Consequently, a bias is applied to the body of each transistor.

The gate line drive circuit 9 (see FIG. 4) outputs a gate signal of 0V to the gate line Gate1(+). The gate line drive circuit 9 also outputs a gate signal of 3V to the inverted gate line xGate1(+). Consequently, the first memory 51 in the first memory block 50A of each sub-pixel SPix is selected.

The gate line drive circuit 9 outputs a gate signal of −3V to the gate lines Gate1(−), Gate2(+), and Gate2(−). The gate line drive circuit 9 also outputs a gate signal of 6V to the inverted gate lines xGate1(−), xGate2(+), and xGate2(−). Consequently, the second memory 52 in the first memory block 50A of each sub-pixel SPix, and the second memory block 50B of each sub-pixel SPix are not selected.

Next, at the timing $t_{26}$ after waiting time has elapsed from the timing $t_{25}$, the power supply potential VMH is set to 3V and the power supply potential VML is set to 0V. The common electrode drive circuit 6 (see FIG. 4) outputs the common potential Vcom of 0V to the common electrode 23.

Consequently, the first memory 51 in the first memory block 50A of the sub-pixel SPix11 stores therein the sub-pixel data "1" (white), and therefore the potential Vpix11 of the sub-pixel electrode 15 of the sub-pixel SPix11 becomes 3V. Thus, in the sub-pixel SPix11, the voltage applied to the liquid crystal molecules LQ is 3V. Consequently, the sub-pixel SPix11 displays a white color.

The first memory 51 in the first memory block 50A of the sub-pixel SPix12 stores therein the sub-pixel data "0" (black), and therefore the potential Vpix12 of the sub-pixel electrode 15 of the sub-pixel SPix12 becomes 0V. Thus, in the sub-pixel SPix12, the voltage applied to the liquid crystal molecules LQ is 0V. Consequently, the sub-pixel SPix12 displays a black color.

The first memory 51 in the first memory block 50A of the sub-pixel SPix13 stores therein the sub-pixel data "0" (black), and therefore the potential Vpix13 of the sub-pixel electrode 15 of the sub-pixel SPix13 becomes 0V. Thus, in the sub-pixel SPix13, the voltage applied to the liquid crystal molecules LQ is 0V. Consequently, the sub-pixel SPix13 displays a black color.

Next, at the timing $t_{27}$, the common electrode drive circuit 6 outputs the common potential Vcom of 3V to the common electrode 23.

The gate line drive circuit 9 outputs a gate signal of −3V to the gate lines Gate1 (+), Gate2(+), and Gate2(−). The gate line drive circuit 9 also outputs a gate signal of 6V to the inverted gate lines xGate1(+), xGate2(+), and xGate2(−). Consequently, the first memory 51 in the first memory block 50A of each sub-pixel SPix, and the second memory block 50B of each sub-pixel SPix are not selected.

The gate line drive circuit 9 outputs a gate signal of 0V to the gate line Gate1(−). The gate line drive circuit 9 also outputs a gate signal of 3V to the inverted gate line xGate1 (−). Consequently, the second memory 52 in the first memory block 50A of each sub-pixel SPix is selected.

Consequently, the second memory 52 in the first memory block 50A of the sub-pixel SPix11 stores therein the sub-pixel data "0" (white (inverted)), and therefore the potential Vpix11 of the sub-pixel electrode 15 of the sub-pixel SPix11 becomes 0V. Thus, in the sub-pixel SPix11, the voltage applied to the liquid crystal molecules LQ is 3V. Consequently, the sub-pixel SPix11 displays a white color.

The second memory 52 in the first memory block 50A of the sub-pixel SPix12 stores therein the sub-pixel data "1" (black (inverted)), and therefore the potential Vpix12 of the sub-pixel electrode 15 of the sub-pixel SPix12 becomes 3V. Thus, in the sub-pixel SPix12, the voltage applied to the liquid crystal molecules LQ is 0V. Consequently, the sub-pixel SPix12 displays a black color.

The second memory 52 in the first memory block 50A of the sub-pixel SPix13 stores therein the sub-pixel data "1"

(black (inverted)), and therefore the potential Vpix13 of the sub-pixel electrode 15 of the sub-pixel SPix13 becomes 3V. Thus, in the sub-pixel SPix13, the voltage applied to the liquid crystal molecules LQ is 0V. Consequently, the sub-pixel SPix13 displays a black color.

Next, at the timing $t_{28}$, the common electrode drive circuit 6 outputs the common potential Vcom of 0V to the common electrode 23.

The gate line drive circuit 9 outputs a gate signal of −3V to the gate lines Gate1 (+), Gate1 (−), and Gate2(−). The gate line drive circuit 9 also outputs a gate signal of 6V to the inverted gate lines xGate1(+), xGate1 (−), and xGate2(−). Consequently, the first memory block 50A of each sub-pixel SPix, and the second memory 52 in the second memory block 50B of each sub-pixel SPix are not selected.

The gate line drive circuit 9 outputs a gate signal of 0V to the gate line Gate2(+). The gate line drive circuit 9 also outputs a gate signal of 3V to the inverted gate line xGate2 (+). Consequently, the first memory 51 in the second memory block 50B of each sub-pixel SPix is selected.

Consequently, the first memory 51 in the second memory block 50B of the sub-pixel SPix11 stores therein the sub-pixel data "0" (black), and therefore the potential Vpix11 of the sub-pixel electrode 15 of the sub-pixel SPix11 becomes 0V. Thus, in the sub-pixel SPix11, the voltage applied to the liquid crystal molecules LQ is 0V. Consequently, the sub-pixel SPix11 displays a black color.

The first memory 51 in the second memory block 50B of the sub-pixel SPix12 stores therein the sub-pixel data "1" (white), and therefore the potential Vpix12 of the sub-pixel electrode 15 of the sub-pixel SPix12 becomes 3V. Thus, in the sub-pixel SPix12, the voltage applied to the liquid crystal molecules LQ is 3V. Consequently, the sub-pixel SPix12 displays a white color.

The first memory 51 in the second memory block 50B of the sub-pixel SPix13 stores therein the sub-pixel data "0" (black), and therefore the potential Vpix13 of the sub-pixel electrode 15 of the sub-pixel SPix13 becomes 0V. Thus, in the sub-pixel SPix13, the voltage applied to the liquid crystal molecules LQ is 0V. Consequently, the sub-pixel SPix13 displays a black color.

Next, at the timing $t_{29}$, the common electrode drive circuit 6 outputs the common potential Vcom of 3V to the common electrode 23.

The gate line drive circuit 9 outputs a gate signal of −3V to the gate lines Gate1(+), Gate1(−), and Gate2(+). The gate line drive circuit 9 also outputs a gate signal of 6V to the inverted gate lines xGate1(+), xGate1(−), and xGate2(+). Consequently, the first memory block 50A of each sub-pixel SPix, and the first memory 51 in the second memory block 50B of each sub-pixel SPix are not selected.

The gate line drive circuit 9 outputs a gate signal of 0V to the gate line Gate2(−). The gate line drive circuit 9 also outputs a gate signal of 3V to the inverted gate line xGate2 (−). Consequently, the second memory 52 in the second memory block 50B of each sub-pixel SPix is selected.

Consequently, the second memory 52 in the second memory block 50B of the sub-pixel SPix11 stores therein the sub-pixel data "1" (black (inverted)), and therefore the potential Vpix11 of the sub-pixel electrode 15 of the sub-pixel SPix11 becomes 3V. Thus, in the sub-pixel SPix11, the voltage applied to the liquid crystal molecules LQ is 0V. Consequently, the sub-pixel SPix11 displays a black color.

The second memory 52 in the second memory block 50B of the sub-pixel SPix12 stores therein the sub-pixel data "0" (white (inverted)), and therefore the potential Vpix12 of the sub-pixel electrode 15 of the sub-pixel SPix12 becomes 0V. Thus, in the sub-pixel SPix12, the voltage applied to the liquid crystal molecules LQ becomes 3V. Consequently, the sub-pixel SPix12 displays a white color.

The second memory 52 in the second memory block 50B of the sub-pixel SPix13 stores therein the sub-pixel data "1" (black (inverted)), and therefore the potential Vpix13 of the sub-pixel electrode 15 of the sub-pixel SPix13 becomes 3V. Thus, in the sub-pixel SPix13, the voltage applied to the liquid crystal molecules LQ is 0V. Consequently, the sub-pixel SPix13 displays a black color.

In this example, the sub-pixel data is read out in the order of the first memory 51 in the first memory block 50A→the second memory 52 in the first memory block 50A→the first memory 51 in the second memory block 50B→the second memory 52 in the second memory block 50B. However, the present disclosure is not limited thereto. For example, the sub-pixel data may be read out in the order of the first memory 51 in the first memory block 50A→the first memory 51 in the second memory block 50B→the second memory 52 in the first memory block 50A→the second memory 52 in the second memory block 50B.

Layout of Sub-Pixel

Figure 29:
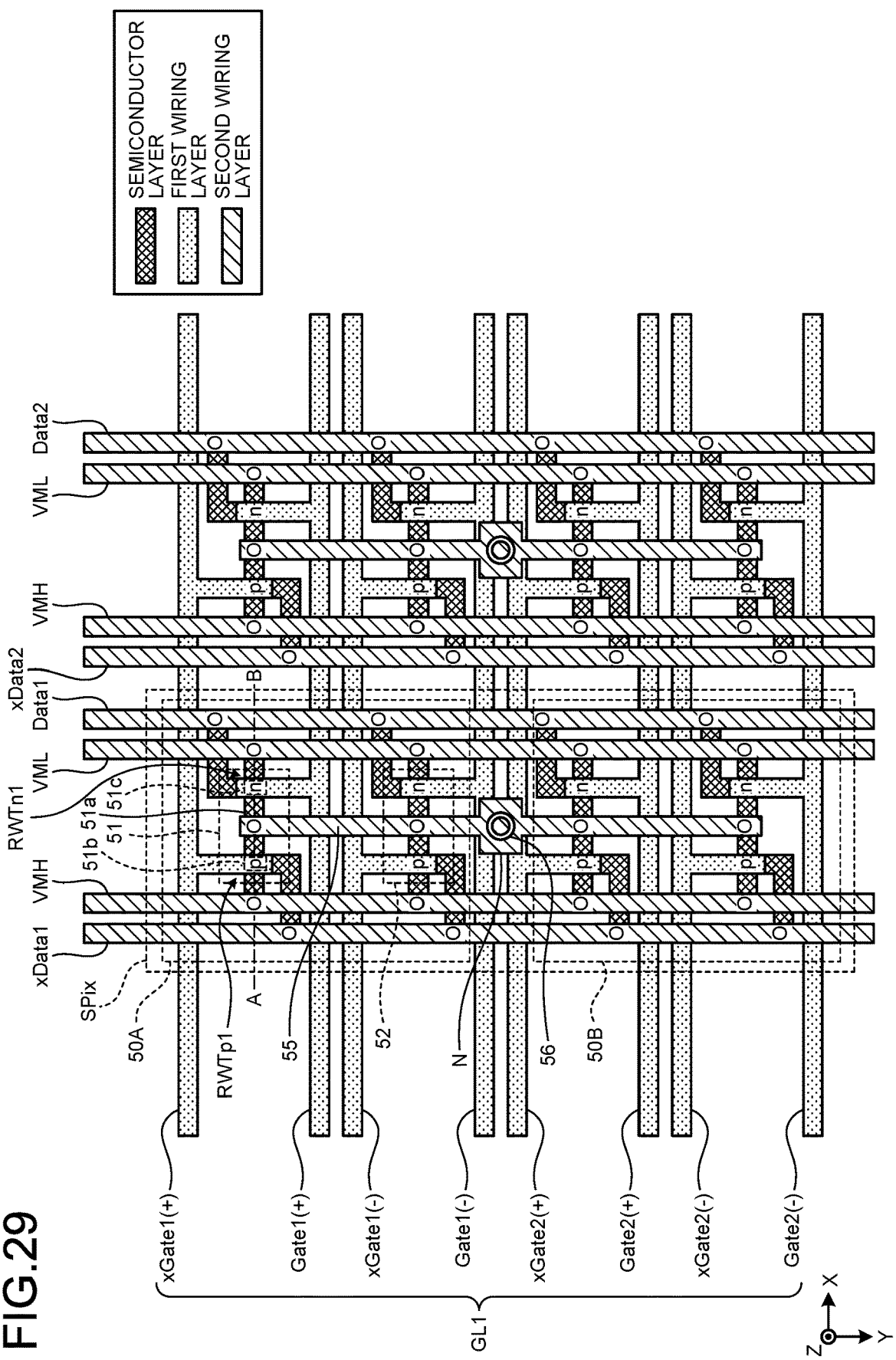
FIG. 29 is a diagram illustrating a layout of the sub-pixels in the display device of the second embodiment.

FIG. 29 is a diagram illustrating a layout of the sub-pixels in the display device of the second embodiment. FIG. 29 illustrates two sub-pixels SPix.

The sub-pixel SPix includes the first memory block 50A and the second memory block 50B. Each of the first memory block 50A and the second memory block 50B includes the first memory 51 and the second memory 52. The node N, which is a coupling point of the memories, is coupled to the sub-pixel electrode (reflective electrode) 15 (see FIG. 2) via a contact 56.

Each of the first memory 51 and the second memory 52 is composed of a semiconductor layer; an inverted gate line xGate1(+), a gate line Gate1(+), an inverted gate line xGate1 (−), a gate line Gate1(−), an inverted gate line xGate2(+), a gate line Gate2(+), an inverted gate line xGate2(−), and a gate line Gate2(−) of a first wiring layer; and an inverted data line xData1, a first high potential power supply wiring VMH, a first low potential power supply wiring VML, a data line Data1, an inverted data line xData2, a second high potential power supply wiring VMH, a second low potential power supply wiring VML, and a data line Data2 of a second wiring layer.

The inverted gate line xGate1(+), the gate line Gate1(+), the inverted gate line xGate1(−), the gate line Gate1 (−), the inverted gate line xGate2(+), the gate line Gate2(+), the inverted gate line xGate2(−), and the gate line Gate2(−) of the first wiring layer extend along the X direction (horizontal direction in the drawing).

The inverted data line xData1, the first high potential power supply wiring VMH, the first low potential power supply wiring VML, the data line Data1, the inverted data line xData2, the second high potential power supply wiring VMH, the second low potential power supply wiring VML, and the data line Data2 of the second wiring layer extend along the Y direction (vertical direction in the drawing).

The first memory 51 and the second memory 52 are disposed between the first high potential power supply wiring VMH and the first low potential power supply wiring VML. The first memory 51 and the second memory 52 are disposed along the Y direction.

The first memory 51 includes the transistors RWTp1 and RWTn1. The transistor RWTp1 includes a semiconductor layer (polycrystalline silicon (polysilicon)) Ma and a floating gate 51b. The semiconductor layer Ma extends along the X direction. The transistor RWTn1 includes the semiconductor layer 51a and a floating gate 51c. The transistors RWTp1 and RWTn1 are disposed along the X direction.

Figure 30:
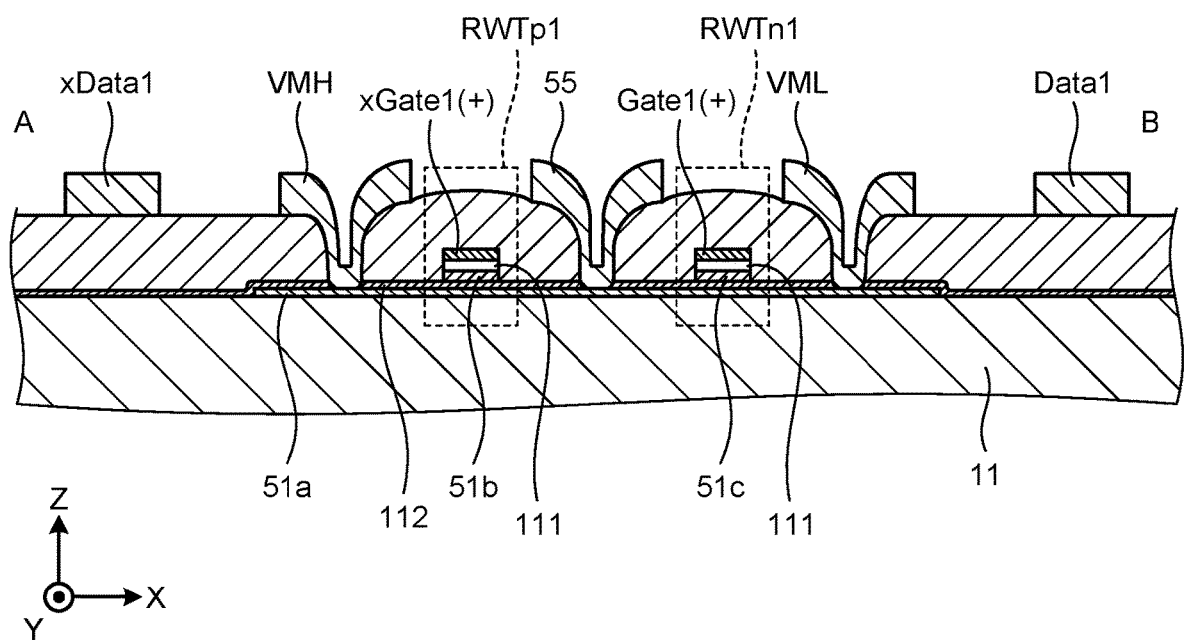
FIG. 30 is an example of a sectional view of the sub-pixel in the display device of the second embodiment.

FIG. 30 is an example of a sectional view of the sub-pixel in the display device of the second embodiment. More specifically, FIG. 30 is a sectional view cut along a line A-B in FIG. 29.

One semiconductor layer 51a extends across the transistors RWTp1 and RWTn1. An end (left end in the drawing) of the semiconductor layer 51a is coupled to the first high potential power supply wiring VMH. The other end (right end in the drawing) of the semiconductor layer 51a is coupled to the first low potential power supply wiring VML. The center portion of the semiconductor layer 51a (portion between the transistor RWTp1 and the transistor RWTn1) is coupled to the node N via wiring 55.

The transistor RWTp1 includes the floating gate 51b formed in an upper layer (upper side in the drawing) with respect to the semiconductor layer 51a with the second gate insulation film (tunnel oxide film) 112 therebetween. The transistor RWTp1 includes the inverted gate line xGate1(+) formed in an upper layer with respect to the floating gate 51b with the first gate insulation film 111 therebetween.

The transistor RWTn1 includes the floating gate 51c formed in an upper layer with respect to the semiconductor layer 51a with the second gate insulation film (tunnel oxide film) 112 therebetween. The transistor RWTn1 includes the gate line Gate1(+) formed in an upper layer with respect to the floating gate 51c with respect to the first gate insulation film 111 therebetween.

Figure 31:
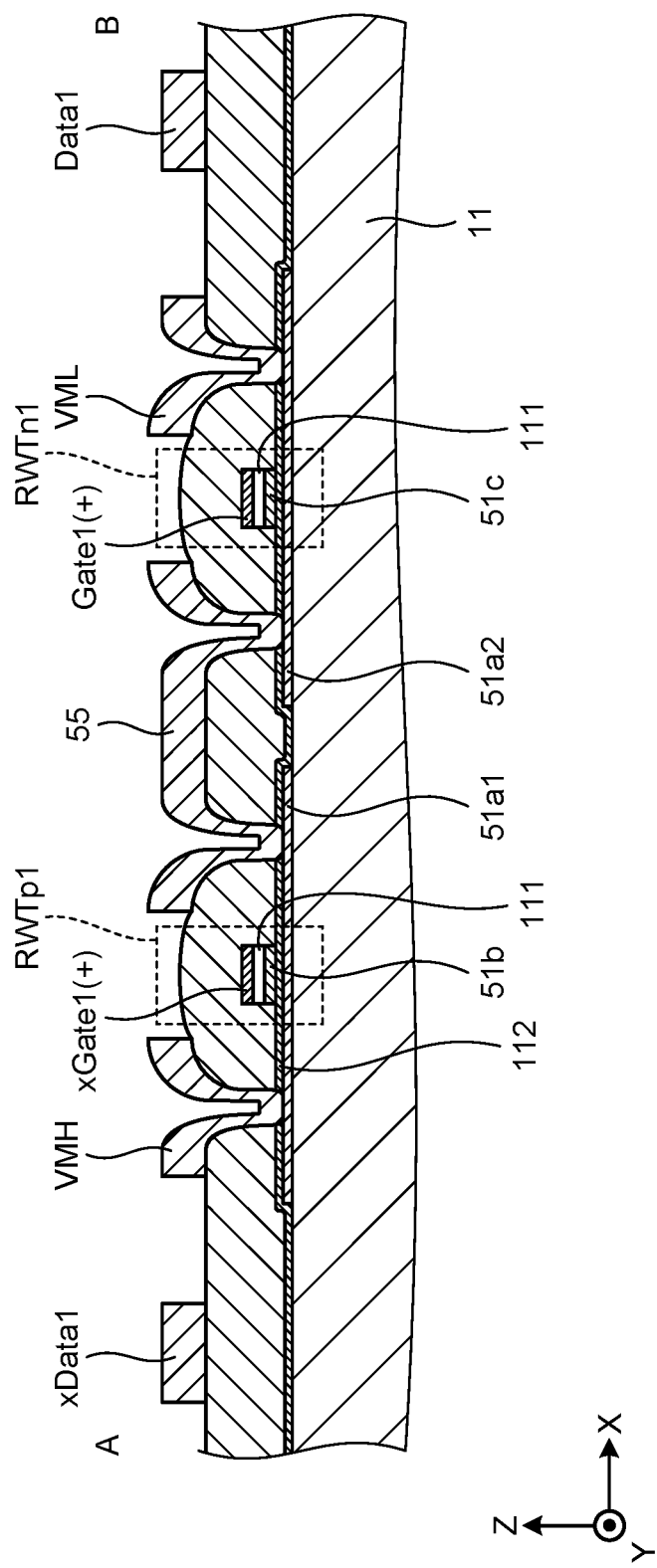
FIG. 31 is another example of the sectional view of the sub-pixel in the display device of the second embodiment.

FIG. 31 is another example of the sectional view of the sub-pixel in the display device of the second embodiment.

In the example illustrated in FIG. 31, two semiconductor layers 51a1 and 51a2 are formed. The semiconductor layers 51a1 and 51a2 are electrically coupled via the wiring 55.

An end (left end in the drawing) of the semiconductor layer 51a1 is coupled to the first high potential power supply wiring VMH. The other end (right end in the drawing) of the semiconductor layer 51a1 is coupled to the wiring 55.

The transistor RWTp1 includes the floating gate 51b formed in an upper layer (upper side in the drawing) with respect to the semiconductor layer 51a1 with the second gate insulation film (tunnel oxide film) 112 therebetween. The transistor RWTp1 includes the inverted gate line xGate1(+) formed in an upper layer with respect to the floating gate 51b with the first gate insulation film 111 therebetween.

The transistor RWTn1 includes the floating gate 51c formed in an upper layer with respect to the semiconductor layer 51a2 with the second gate insulation film (tunnel oxide film) 112 therebetween. The transistor RWTn1 includes the gate line Gate1 (+) formed in an upper layer with respect to the floating gate 51c with the first gate insulation film 111 therebetween.

The display device of the second embodiment exhibits the same advantageous effects as those of the display devices 1 and 1A of the first embodiment.

The display device of the second embodiment can also store two pieces of frame data, and switch and display two frames (images) on the basis of the two pieces of frame data.

The display device of the first and second embodiments can be suitably applied to an electronic signboard and an electronic shelf label. There are two reasons as follows.

First, in the flash memory, the second gate insulation film (tunnel oxide film) 112 formed between the semiconductor substrate and the floating gate becomes deteriorated every time an electron passes through. That is, the second gate insulation film (tunnel oxide film) 112 becomes deteriorated every time the sub-pixel data is written. Thus, there is an upper limit to the number of times the flash memory can be rewritten.

When the display device of the first and second embodiments is applied to a smartphone or a personal computer, sub-pixel data is frequently written to the sub-pixel SPix. Consequently, there is high probability of reducing the life expectancy of the device. Thus, when the display device of the first and second embodiments is applied to a smartphone or a personal computer, the life expectancy of the device should be taken into consideration.

On the other hand, in an electronic signboard or an electronic shelf label, sub-pixel data is written to the sub-pixel SPix only when the contents of the advertisement or the contents of the notification are changed, when the product price is changed, when the product is replaced, or the like. Thus, when the display device of the first and second embodiments is applied to the electronic signboard or the electronic shelf label, sub-pixel data is not frequently written to the sub-pixel SPix. Consequently, there is less probability of reducing the life expectancy of the device. Thus, when the display device of the first and second embodiments is applied to the electronic signboard or the electronic shelf label, there is substantially no need to take the life expectancy of the device into consideration.

Secondly, in the electronic signboard or the electronic shelf label, the same image may be repeatedly displayed for days during which the contents of the advertisement or the contents of the notification are not changed, during which the product price is not changed, during which the product is not replaced, or the like. If a volatile memory such as DRAM and SRAM is used for the electronic signboard or the electronic shelf label, for example, sub-pixel data needs to be written to the DRAM, SRAM, or the like every day before the merchandise store is opened, even if the same image displayed up to the previous day is to be displayed. Alternatively, the sub-pixel data up to the previous day stored in the DRAM and SRAM needs to be maintained, by providing a storage battery for the electronic signboard or the electronic shelf label.

On the other hand, when the display device of the first and second embodiments is applied to the electronic signboard or the electronic shelf label, a non-volatile flash memory is used in the sub-pixel SPix, whereby, if the same image displayed up to the previous day is to be displayed, there is no need to write sub-pixel data to the sub-pixel SPix every day before the merchandise store is opened. There is also no need to provide a storage battery for the electronic signboard or the electronic shelf label. Thus, when the display device of the first and second embodiments is applied to the electronic signboard or the electronic shelf label, it is possible to improve the convenience of the merchandise store.

Preferred embodiments of the present disclosure have been described. However, the present disclosure is not limited to such embodiments. The content disclosed in the embodiments is merely an example, and various modifications may be made within the spirit and scope of the present disclosure. Appropriate modifications made within the spirit and scope of the present disclosure naturally belongs to a technical scope of the present disclosure. At least one of various omissions, substitutions, and changes of the components may be made without departing from the scope of the embodiments and modifications described above.

What is claimed is:

1. A display device comprising:
a plurality of sub-pixels, wherein
each of the sub-pixels includes
- a memory block including a memory configured to store therein sub-pixel data, and
- a sub-pixel electrode coupled to the memory block, the memory includes first and second transistors configured to store therein the sub-pixel data in accordance with an electrical charge of a floating gate, the first and second transistors including respective drains that are coupled to each other, a coupling point of the drains being coupled to a node, the sub-pixel electrode is coupled to the node, each of the sub-pixels is configured to display an image based on a potential of the node, the memory block includes a plurality of the memories including a first memory and a second memory, the second memory is configured to store therein the sub-pixel data obtained by logically inverting the sub-pixel data stored in the first memory, each of the sub-pixels is configured to
- display an image based on the sub-pixel data stored in the first memory during a first field period, and
- display an image based on the sub-pixel data stored in the second memory during a second field period, each of the sub-pixels includes a plurality of the memory block including a first memory block and a second memory block, and each of the sub-pixels is configured to
- display an image based on the sub-pixel data stored in the first memory of the first memory block, during a first field period of a first frame period,
- display an image based on the sub-pixel data stored in the second memory of the first memory block, during a second field period of the first frame period,
- display an image based on the sub-pixel data stored in the first memory of the second memory block, during a first field period of a second frame period, and
- display an image based on the sub-pixel data stored in the second memory of the second memory block, during a second field period of the second frame period.

* * * * *